(12) United States Patent
Chaloner et al.

(10) Patent No.: US 7,104,618 B2
(45) Date of Patent: *Sep. 12, 2006

(54) RECONFIGURABLE DATA CARTRIDGE IMPORT/EXPORT DRAWER

(75) Inventors: Michael J. Chaloner, Fort Collins, CO (US); Paul C Coffin, Ft Collins, CO (US); Richard Lynn Gardner, Jr., Greeley, CO (US)

(73) Assignee: Hewlett-Packard Development Company, L.P., Houston, TX (US)

( * ) Notice: Subject to any disclaimer, the term of this patent is extended or adjusted under 35 U.S.C. 154(b) by 0 days.

This patent is subject to a terminal disclaimer.

(21) Appl. No.: 11/305,708

(22) Filed: Dec. 16, 2005

(65) Prior Publication Data

US 2006/0091767 A1    May 4, 2006

Related U.S. Application Data

(63) Continuation of application No. 10/678,866, filed on Oct. 3, 2003, which is a continuation of application No. 09/837,601, filed on Apr. 18, 2001, now Pat. No. 6,648,428.

(51) Int. Cl.
  *G11B 21/08* (2006.01)
(52) U.S. Cl. .................... 312/9.43; 369/30.48
(58) Field of Classification Search ........ 312/333, 312/334.44, 273, 298, 301, 286, 334.27, 312/334.29, 334.31, 9.41, 9.42, 9.43, 9.44, 312/9.47, 9.83, 9.55, 198, 201; 369/34.01, 369/35.01, 36.01, 38.01, 178.01, 191, 192, 369/75.1; 360/98.04, 98.06, 98.01, 92
See application file for complete search history.

(56) References Cited

U.S. PATENT DOCUMENTS

| | | |
|---|---|---|
| 480,693 A | 8/1892 | Foster et al. |
| 1,268,141 A | 6/1918 | Nystrom |
| 1,568,212 A | 1/1926 | Cygan |
| 2,227,703 A | 3/1942 | Kennedy et al. |
| 2,728,626 A | 12/1955 | Gussack |
| 2,739,027 A | 3/1956 | Gussack |
| 2,802,582 A | 8/1957 | Isven |
| 3,270,253 A | 8/1966 | Binder et al. |
| 3,467,251 A | 9/1969 | Janss et al. |
| 3,477,770 A | 11/1969 | Niemi |
| 3,700,301 A | 10/1972 | Boeck |
| 3,799,638 A | 3/1974 | Faiks |
| 4,072,375 A | 2/1978 | Boone |
| 4,679,950 A | 7/1987 | Delmege et al. |
| 4,759,341 A | 7/1988 | McFarland |
| 4,982,851 A | 1/1991 | Konstant |
| 5,026,176 A | 6/1991 | Jensen et al. |
| 5,219,216 A | 6/1993 | Hassel et al. |
| 5,255,251 A | 10/1993 | Fitzgerald et al. |
| 5,626,405 A | 5/1997 | Banks |

(Continued)

FOREIGN PATENT DOCUMENTS

| | | |
|---|---|---|
| EP | 0997896 A2 | 5/2000 |
| JP | 5-234203 | 10/1993 |

*Primary Examiner*—Janet M. Wilkens

(57) ABSTRACT

Data cartridge exchange apparatus for use in a data storage system may include a moveable cartridge storage array having at least a first data cartridge storage location and a second data cartridge storage location. The first data cartridge storage location is operatively associated with the second data cartridge storage location so that the first data cartridge storage location is independently moveable with respect to the second data cartridge storage location when the second data cartridge storage location is accessible by the data storage system.

12 Claims, 16 Drawing Sheets

U.S. PATENT DOCUMENTS

| | | | |
|---|---|---|---|
| 5,761,161 A | 6/1998 | Gallo et al. | |
| 5,940,354 A | 8/1999 | Inoue | |
| 5,951,132 A | 9/1999 | Cirocco | |
| 5,961,193 A | 10/1999 | Hobbs | |
| 6,025,972 A | 2/2000 | Schmidtke et al. | |
| 6,038,099 A | 3/2000 | Heinze et al. | |
| 6,050,628 A | 4/2000 | Allison et al. | |
| 6,065,819 A | 5/2000 | Holmes et al. | |
| 6,160,786 A | 12/2000 | Coffin et al. | |
| 6,411,462 B1 | 6/2002 | Ostwald et al. | |
| 6,643,091 B1 | 11/2003 | Coffin et al. | |
| 6,643,226 B1 | 11/2003 | Thayer et al. | |
| 6,648,428 B1 | 11/2003 | Chaloner et al. | |
| 6,654,318 B1 | 11/2003 | Coffin et al. | |
| 6,661,602 B1 * | 12/2003 | Benson et al. | 360/92 |
| 6,733,223 B1 | 5/2004 | Mueller et al. | |
| 6,917,993 B1 * | 7/2005 | Johnson et al. | 710/74 |
| 6,957,291 B1 * | 10/2005 | Moon et al. | 710/302 |
| 2002/0125321 A1 * | 9/2002 | Reasoner et al. | 235/462.25 |
| 2003/0039179 A1 | 2/2003 | Coffin et al. | |
| 2003/0039182 A1 | 2/2003 | Mueller et al. | |
| 2004/0008445 A1 | 1/2004 | Vanderheyden | |
| 2004/0066119 A1 | 4/2004 | Chaloner et al. | |

* cited by examiner

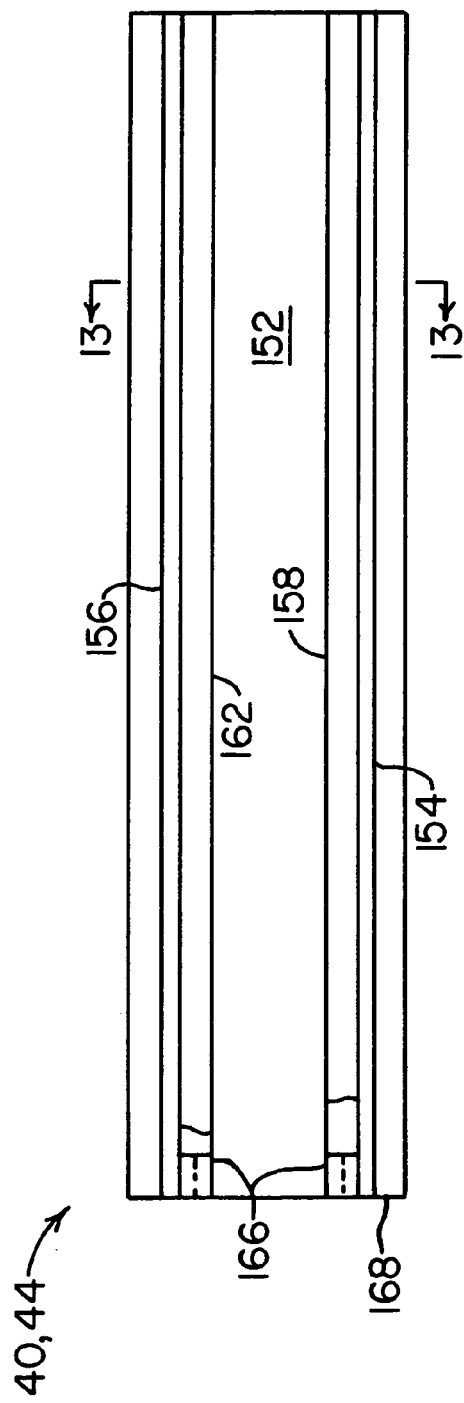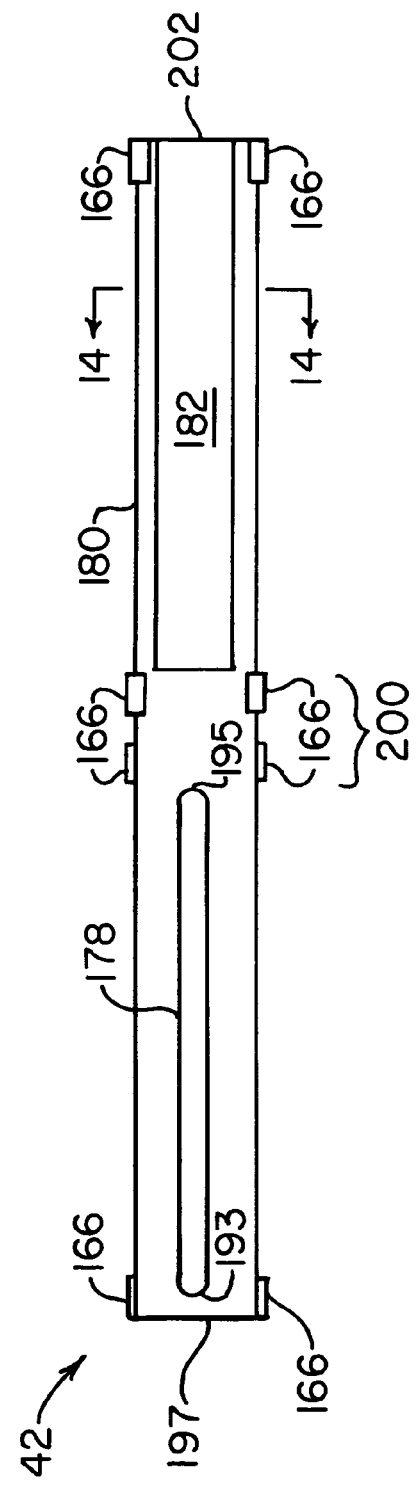

RECONFIGURABLE DATA CARTRIDGE IMPORT/EXPORT DRAWER

CROSS-REFERENCE TO RELATED APPLICATION

This is a continuation of U.S. patent application Ser. No. 10/678,866, filed on Oct. 3, 2003, which is a continuation of U.S. patent application Ser. No. 09/837,601, filed on Apr. 18, 2001, now U.S. Pat. No. 6,648,428, both of which are hereby incorporated herein by reference for all that they disclose.

FIELD OF INVENTION

This invention relates in general to data cartridge exchange systems for data storage systems, and more specifically to a data storage system having a reconfigurable data cartridge exchange drawer.

BACKGROUND

Many different types of data storage systems exist and are being used to store data cartridges at known locations and to retrieve those data cartridges from the storage locations so that data may be written to or read from those data cartridges. Such data storage systems are often referred to as "jake box" data storage systems, particularly if they can accommodate a large number of individual data cartridges.

A typical data storage system may include one or more different types of cartridge receiving devices for holding the various data cartridges. For example, one type of cartridge receiving device may comprise a cartridge storage rack or "magazine." The cartridge storage racks or magazines usually include cartridge storage slots which serve as storage locations for the data cartridges. The various cartridge storage racks or magazines of the data storage system are commonly arranged so that they form one or more vertical and/or horizontal stacks, although other configurations are possible. Another type of cartridge receiving device may comprise a cartridge read/write device. The cartridge read/write device may be located adjacent a cartridge magazine, although the cartridge read/write device may be positioned at any convenient location.

The data storage system may also be provided with a cartridge handling system for transporting the data cartridges between the various cartridge receiving devices, e.g., between the cartridge storage racks and the cartridge read/write devices. A typical cartridge handling system may include a cartridge access device for accessing the various data cartridges contained in the cartridge receiving devices, as well as a positioning system for moving the cartridge access device among the various cartridge receiving devices contained in the data storage system.

Data storage systems of the type described above are usually connected to a host computer system (not shown) which may access or store data on the data cartridges. For example, if certain data contained on a particular data cartridge is desired, the host computer system will issue commands to a control system associated with the data storage system. In response to those commands, the control system will actuate the positioning system which moves the cartridge access device along the cartridge storage racks or magazines until the cartridge access device is positioned adjacent the desired data cartridge. The cartridge access device may then remove the desired cartridge from the cartridge storage rack and carry it to the cartridge read/write device. Once properly positioned adjacent the cartridge read/write device, the cartridge access device may insert the selected data cartridge into the cartridge read/write device so that the host computer may thereafter read data from or write data to the selected data cartridge. After the read/write operation is complete, the cartridge access device may remove the data cartridge from the cartridge read/write device and return it to its appropriate location in the cartridge storage rack.

It is often necessary or desirable for a system operator to periodically access one or more of the data cartridges contained within such a data storage system. For example, it may be necessary for the system operator to remove certain of the data cartridges from time to time if they become filled with data that is to be archived at another location. The system operator may then replace the filled data cartridges with blank or empty data cartridges. In another situation, the system operator may desire to remove one or more of the data cartridges and replace it or them with a substitute data cartridge or cartridges containing different data.

In order to accommodate the foregoing needs, many data storage systems are provided with an access panel to allow the system operator to access the data cartridges stored within the data system. Although such an arrangement does allow the system operator to access the data cartridges, it is usually difficult and cumbersome to implement in practice. For example, since the access panel needs to be removed in order to access the data cartridges, the data storage system must be temporarily shut-down or suspended in order to prevent injury to the system operator should the cartridge access device move while the system operator's hand is inside the data storage system. Another difficulty is that it is often difficult for the system operator to locate the particular data cartridges that are to be replaced. Still another disadvantage is that once the access panel has been replaced, it is necessary for the data storage system to re-inventory all the data cartridges contained therein. Such re-inventory processes are time consuming and difficult to justify, particularly if only one cartridge has been replaced. Nevertheless, the data storage system must re-inventory all of the data cartridges within the data storage system before it can be returned to service.

Partly in an effort to solve some of the aforementioned problems, data storage systems have been developed that include extendable drawers that can be opened to allow the system operator to access the data cartridges stored in the data storage systems. Such an extendable drawer is useful in that it allows the system operator to access one or more data cartridges without the need to remove a separate access panel.

Unfortunately, most drawer type of data cartridge exchange systems are not without their disadvantages. For example, if the system operator only wishes to access a data cartridge positioned near the front of the drawer, the system operator must nevertheless move all of the data cartridges within the drawer. In other words, by opening the drawer, the system operator renders all of the data cartridges within the drawer inaccessible to the cartridge handling system of the data storage system. Indeed, the data storage system will not be able to access any of the data cartridges within the drawer until the system operator finishes accessing the exposed data cartridges and closes the drawer.

SUMMARY OF THE INVENTION

In one embodiment, data cartridge exchange apparatus for use in a data storage system may include a moveable cartridge storage array having at least a first data cartridge storage location and a second data cartridge storage location. The first data cartridge storage location is operatively associated with the second data cartridge storage location so that the first data cartridge storage location is independently moveable with respect to the second data cartridge storage location when the second data cartridge storage location is accessible by the data storage system.

One embodiment of a data storage system may include a cartridge handling system. A fixed cartridge storage array defines at least one data cartridge storage location and is mounted within the data storage system so that the data cartridge storage location can be accessed by the cartridge handling system. A moveable cartridge storage array defines at least a first data cartridge storage location and a second data cartridge storage location. The first data cartridge storage location is independently moveable with respect to the second data cartridge storage location so that the first data cartridge storage location can be moved with respect to the second data cartridge storage location between a first position and a second position. The moveable cartridge storage array is moveable with respect to the data storage system between a retracted position and an extended position so that at least the second cartridge storage location can be accessed by the cartridge handling system when the moveable cartridge storage array is in the retracted position.

BRIEF DESCRIPTION OF THE DRAWING

Illustrative and presently preferred embodiments of the invention are shown in the accompanying drawing in which:

FIG. 11 is a plan view of the second and fourth guide rails of the mounting system shown in FIG. 8 with portions of the bearing tracks broken away to show the U-shaped bearing members mounted thereon;

FIG. 12 is a plan view of the third guide rail showing the relative positions of the U-shaped bearings thereon;

DETAILED DESCRIPTION OF THE INVENTION

Figure 1:
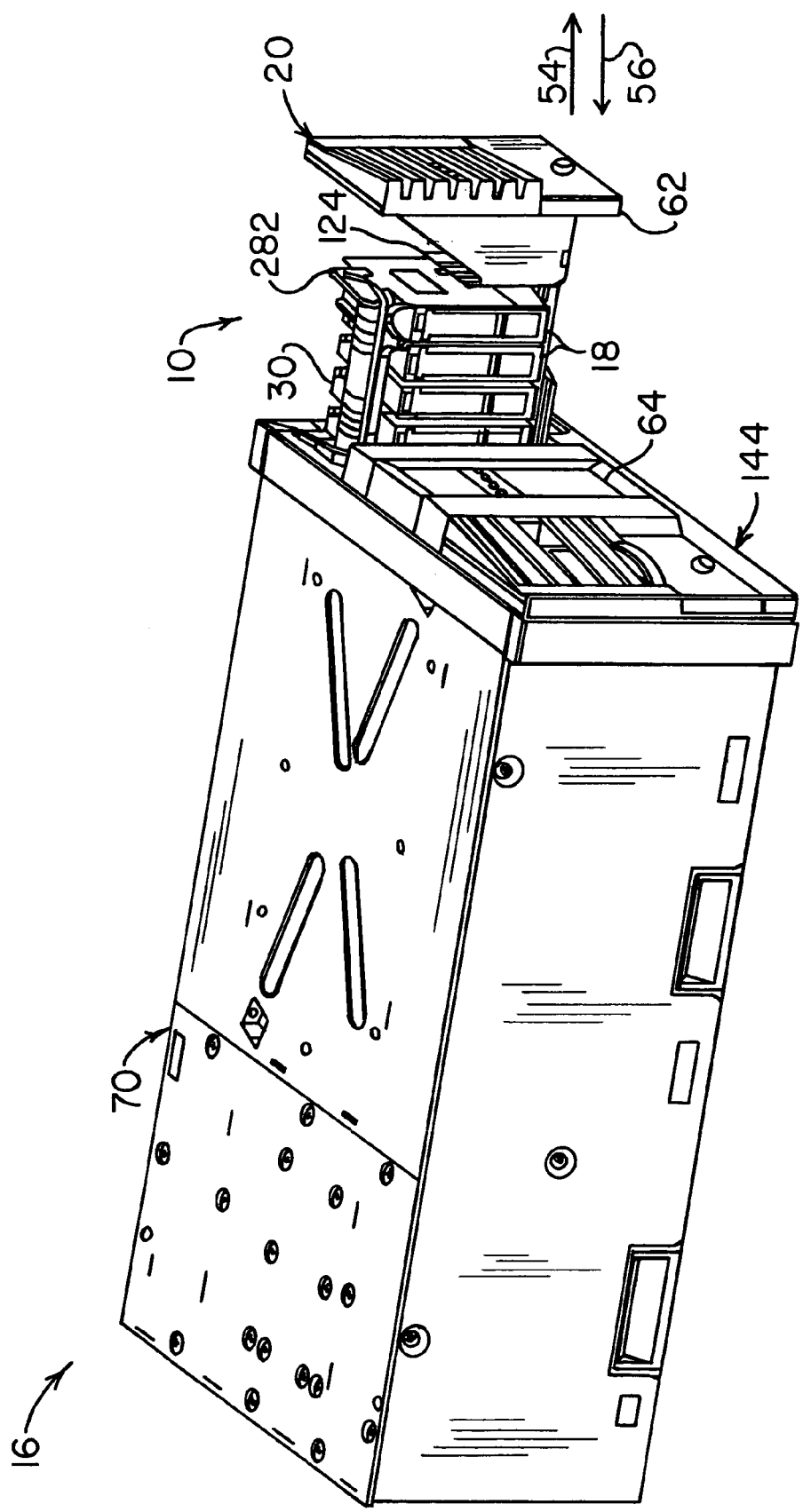
FIG. 1 is a perspective view of a data storage system having a data cartridge exchange apparatus according to one embodiment of the present invention.
Figure 2:
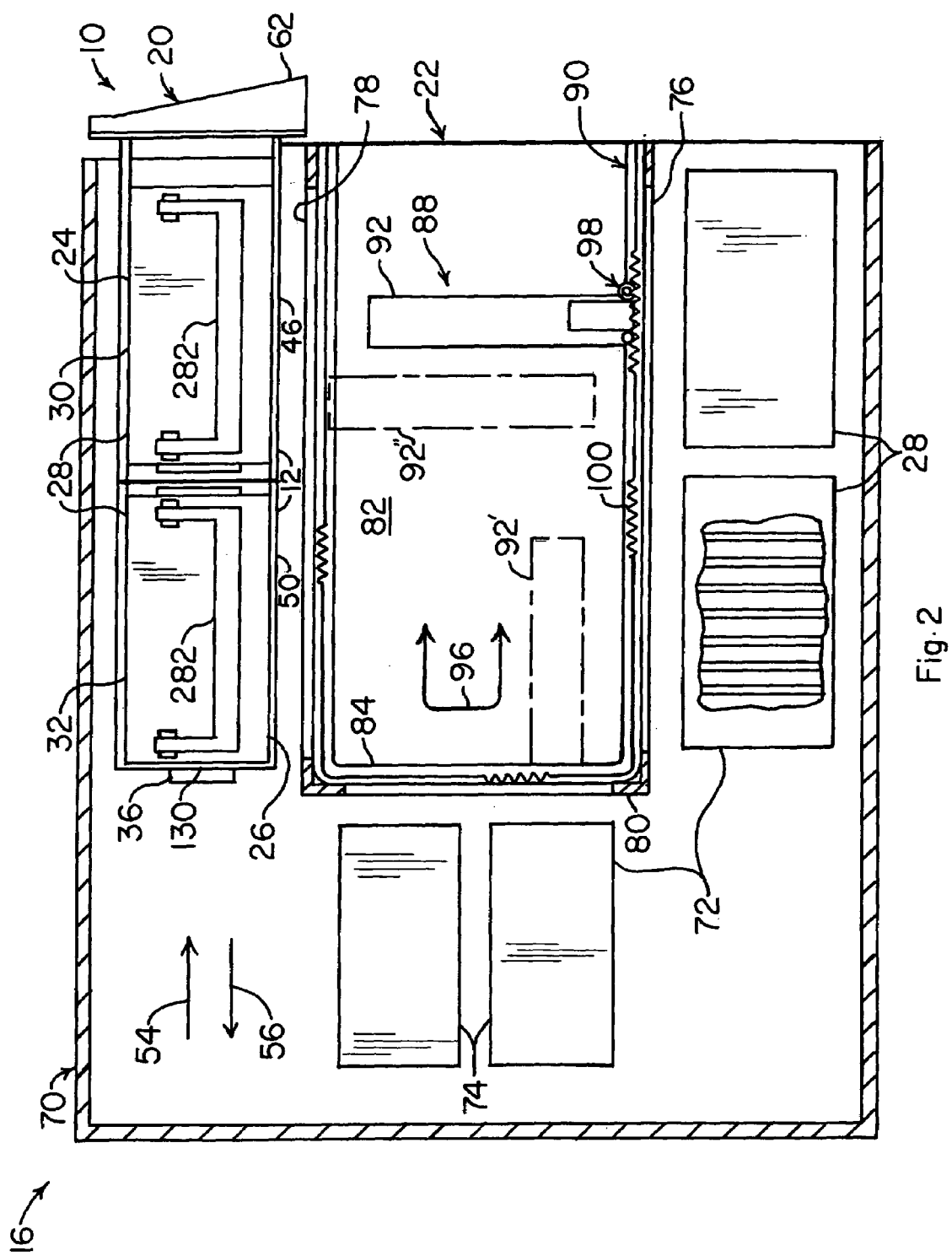
FIG. 2 is a plan view of the data storage system shown in FIG. 1 illustrating a cartridge handling system that may be used to access the data cartridges, the internal arrangements of the data cartridge storage locations, and the data cartridge exchange apparatus in a first configuration.
Figure 3:
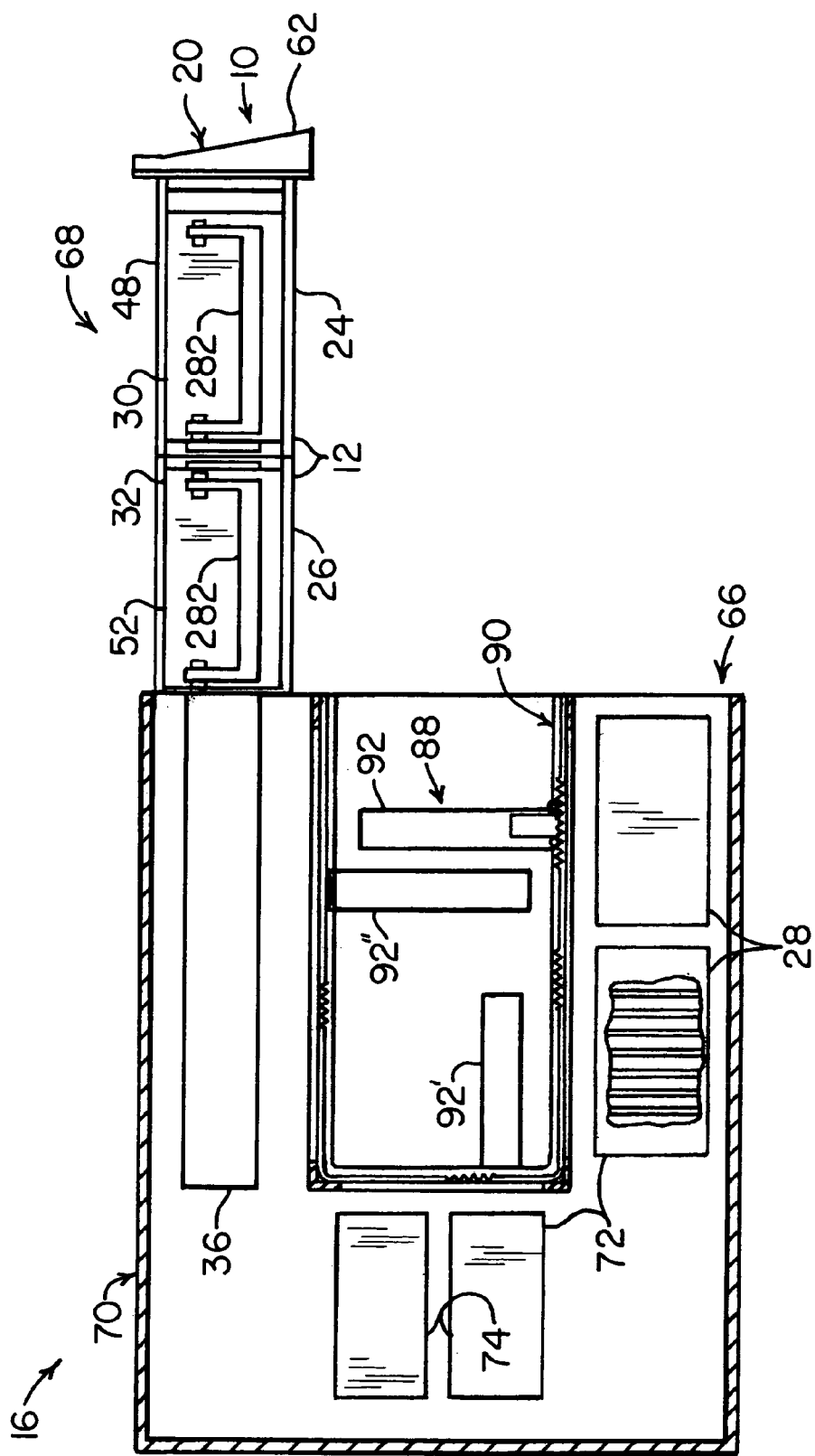
FIG. 3 is another plan view of the data storage system shown in FIG. 1 illustrating the drawer fully opened and the data cartridge exchange apparatus in the first configuration.
Figure 4:
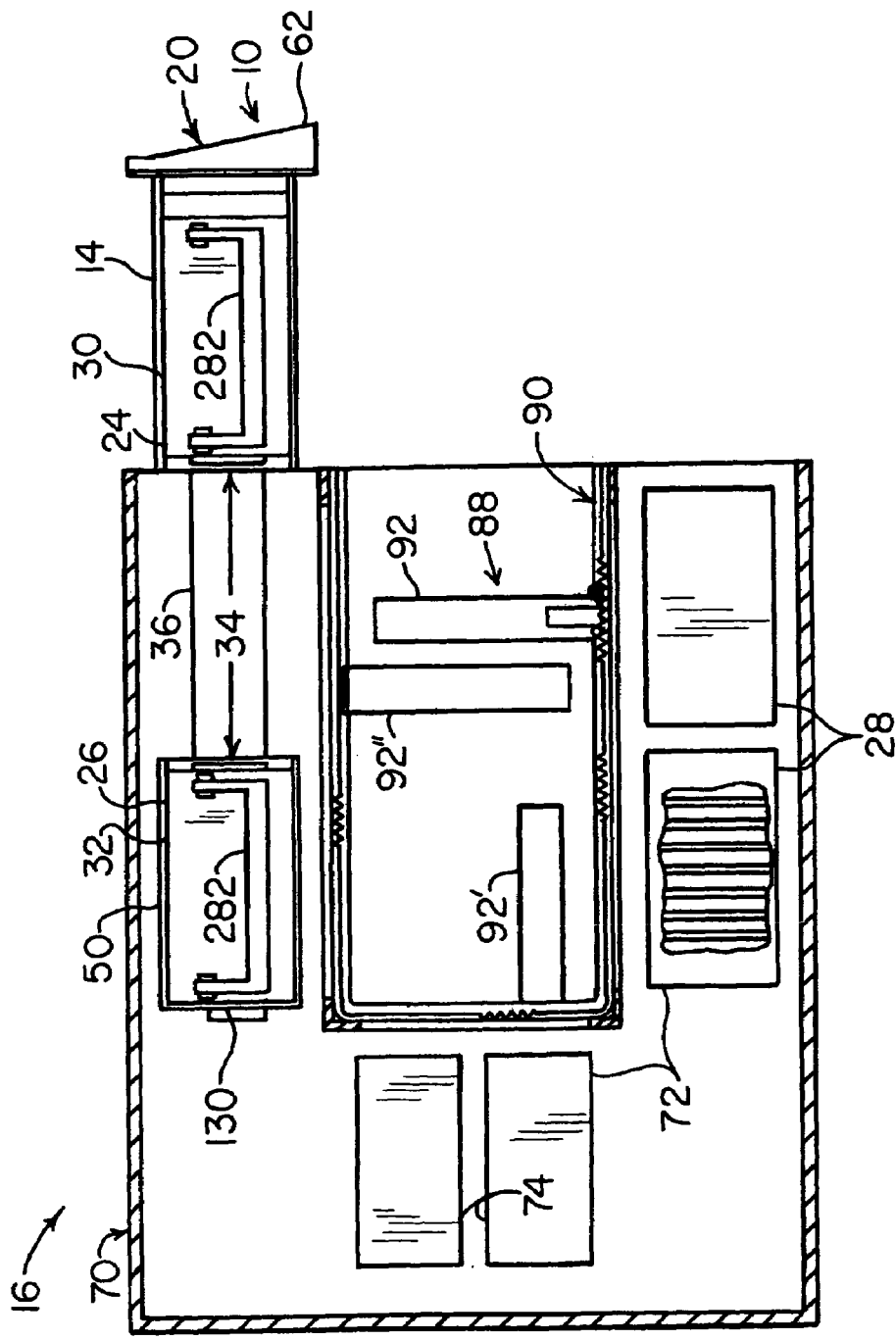
FIG. 4 is yet another plan view of the data storage system shown in FIG. 1 illustrating the data cartridge exchange apparatus in the second configuration.

A data cartridge exchange apparatus 10 according to one preferred embodiment of the present invention is shown in a first configuration 12 in FIGS. 2 and 3 and in a second configuration 14 in FIG. 4 and is described herein as it could be used in conjunction with a data storage system 16 (FIG. 1). The data cartridge exchange apparatus 10 when in the second configuration 14 allows a system operator (not shown) to access at least one data cartridge 18 stored in a drawer 20 without having to render all of the other data cartridges 18 within the drawer 20 inaccessible to a cartridge handling system 22 (FIGS. 2 and 5) of the data storage system 16. Alternatively, the system operator may use the data cartridge exchange apparatus 10 in the first configuration 12 to access all of the data cartridges 18 within the drawer 20. Thus, the data cartridge exchange apparatus 10 not only provides a convenient and effective way for the system operator to deposit and withdraw selected data cartridges 18 into and from the data storage system 16, but it also provides the system operator with the option of accessing some of the data cartridges 18 within the drawer 20 without having to render all of the data cartridges 18 within the drawer 20 inaccessible to the cartridge handling system 22 when doing so.

Figure 7:
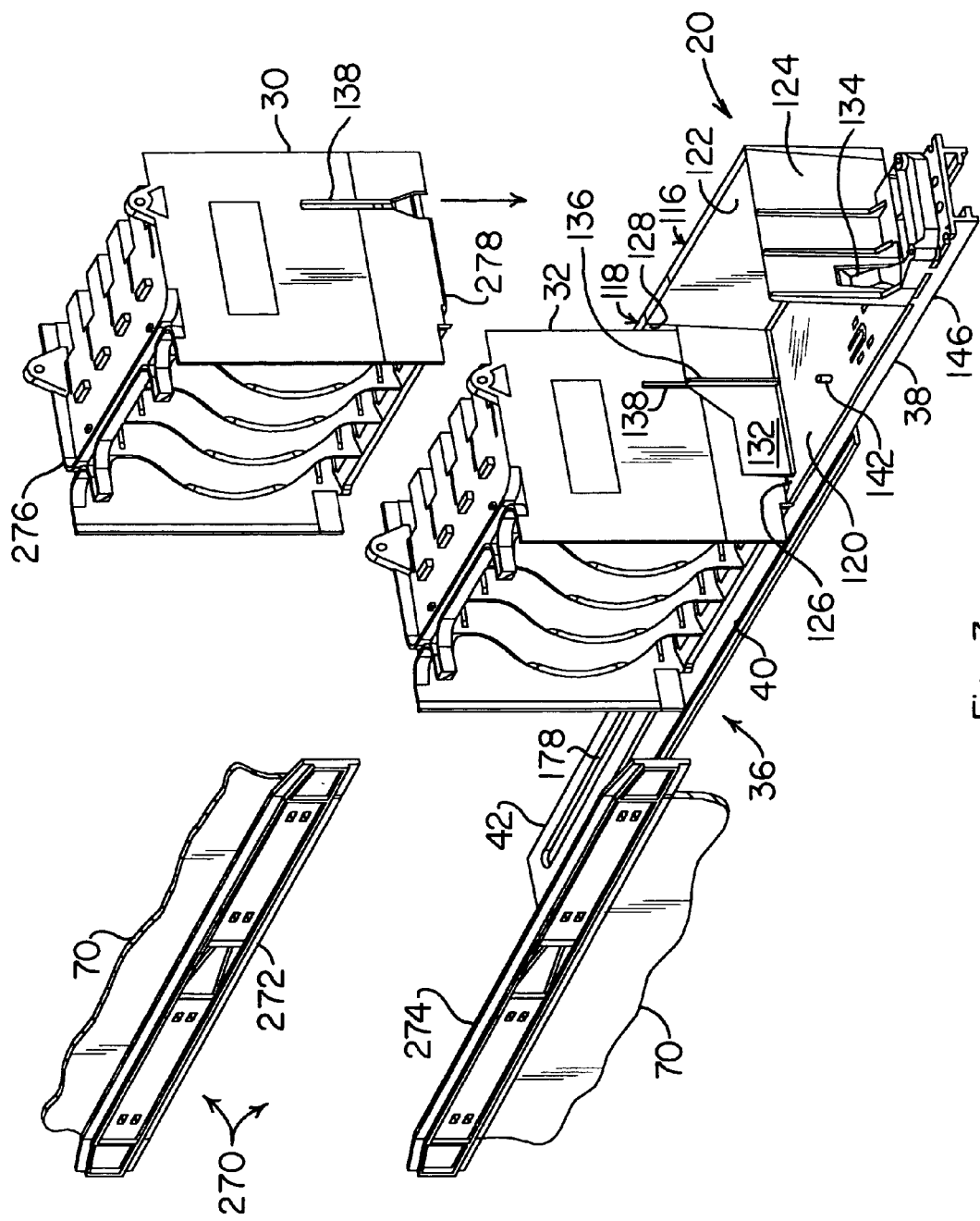
FIG. 7 is an exploded perspective view of the drawer, drawer mounting system, and cartridge magazine reference rails of the data cartridge exchange apparatus shown in FIG. 1.

With reference now primarily to FIGS. 2 and 7, the data cartridge exchange apparatus 10 utilized in one preferred embodiment may comprise a drawer 20 that defines a plurality of data cartridge storage locations, such as first and second data cartridge storage locations 24 and 26. Each of the data cartridge storage locations (e.g., 24 and 26) may be configured to receive one or more data cartridges 18, which in one preferred embodiment, may be contained within one or more cartridge magazines 28. In the embodiment shown and described herein, the first and second data cartridge storage locations 24 and 26 of drawer 20 are configured to receive first and second cartridge magazines 30 and 32, respectively, each of which is configured to receive one or more data cartridges 18. Alternatively, and as will be described in greater detail below, the first and second data cartridge storage locations 24 and 26 defined by the drawer 20 may instead be configured to directly accept one or more data cartridges 18 without the need for separate cartridge magazines 28.

The first and second data cartridge storage locations 24 and 26 may be operatively associated so that they may be moved along with each other as a single unit. The first and second data cartridge storage locations 24 and 26, however, may also be movable with respect to each other so that the data cartridge exchange apparatus 10 defines a plurality of configurations (e.g., the first configuration 12 and the second configuration 14). That is, in the embodiment shown and described herein, the system operator may reconfigure the data cartridge exchange apparatus 10 by moving the first data cartridge storage location 24 either toward or away from the second data cartridge storage location 26. For example, the system operator may position the first and second data cartridge storage locations 24 and 26 adjacent one another thereby defining the first configuration 12 for the data cartridge exchange apparatus 10. See FIGS. 2, 3 and 7. Alternatively, the system operator may separate the first and second data cartridge storage locations 24 and 26 by a spaced distance 34 thereby defining the second configuration 14 for the data cartridge exchange apparatus 10. See FIG. 4.

The drawer 20 may be mounted to the data storage system 16 by a mounting system 36. As will be explained in greater detail below, the mounting system 36 may comprise a first guide rail 38 mounted to the first data cartridge storage location 24, a second guide rail 40 mounted to the second data cartridge storage location 26, a third guide rail 42 sized to engage the first and second guide rails 38 and 40, and a fourth guide rail 44 mounted to the data storage system 16. See FIGS. 7–16. The first and second guide rails 38 and 40 may each be mounted in sliding engagement with the third guide rail 42, which in turn may be mounted in sliding engagement with the fourth guide rail 44. The sliding engagement of the various rails 38, 40, 42, and 44 allows the drawer 20 (i.e., both data cartridge storage locations 24 and 26) to be slidably moved between a retracted position (FIG. 2) and an extended or open position (FIG. 3). More specifically, the sliding engagement of the various rails 38, 40, 42, and 44 allows the first data cartridge storage location 24 to be slidably moved between a first position 46 (FIG. 2) and a second position 48 (FIG. 3) generally in the directions indicated by arrows 54 and 56. The sliding engagement of the various rails 38, 40, 42, and 44 also allows the second data cartridge storage location 26 to be slidably moved between a third position 50 (FIG. 2) and a fourth position 52 (FIG. 3) generally in the directions indicated by arrows 54 and 56. As shown in FIG. 2, the first and third positions 46 and 50 may each be located within the data storage system 16 so that the data cartridges 18 within the first and second data cartridge storage locations 24 and 26 are within the data storage system 16 when the first and second data cartridge locations 24 and 26 are in their respective first and third positions 46 and 50. The second and fourth positions 48 and 52 may be located outside the data storage system 16 so that the data cartridges 18 within the first and second data cartridge storage locations 24 and 26 are exposed to the system operator when the first and second data cartridge storage locations 24 and 26 are in their respective second and fourth positions 48 and 52. See FIG. 3.

To allow the first and second data cartridge storage locations 24 and 26 to either be moved along with each other (i.e., as a single unit) or individually with respect to the other (i.e., as separate units), the first and second guide rails 38 and 40 may be releasably engaged with one another. That is, the first and second data cartridge storage locations 24 and 26 move together as one unit when the guide rails 38 and 40 are engaged but may be moved with respect to each other when the guide rails 38 and 40 are disengaged and the first and second data cartridge storage locations 24 and 26 are not otherwise engaged. Alternatively, the data cartridge storage locations 24 and 26 themselves may be releasably engaged with one another instead of being engaged by way of the engagement of the first guide rail 38 with the second guide rail 40.

In one preferred embodiment, a lock assembly 58 (FIG. 17) may be provided that is usable to secure the first guide rail 38 to the second guide rail 40. With the first and second guide rails 38 and 40 secured to each other by the lock assembly 58, the first and second data cartridge storage locations 24 and 26 may be moved as a single unit thereby allowing both data cartridge storage locations 24 and 26 to be positioned outside the data storage system 16 when the drawer 20 is fully opened. However, when the first and second guide rails 38 and 40 are not secured to each other and the first and second data cartridge storage locations 24 and 26 are not otherwise engaged, the first data cartridge storage location 24 may be moved outside the data storage system 16 while the second data cartridge storage location 26 remains within the data storage system 16. Consequently, the system operator will be able to access the data cartridges 18 positioned within the first data cartridge storage location 24 without rendering the data cartridges 18 within the second data cartridge storage location 26 inaccessible to the data storage system 16.

Figure 20:
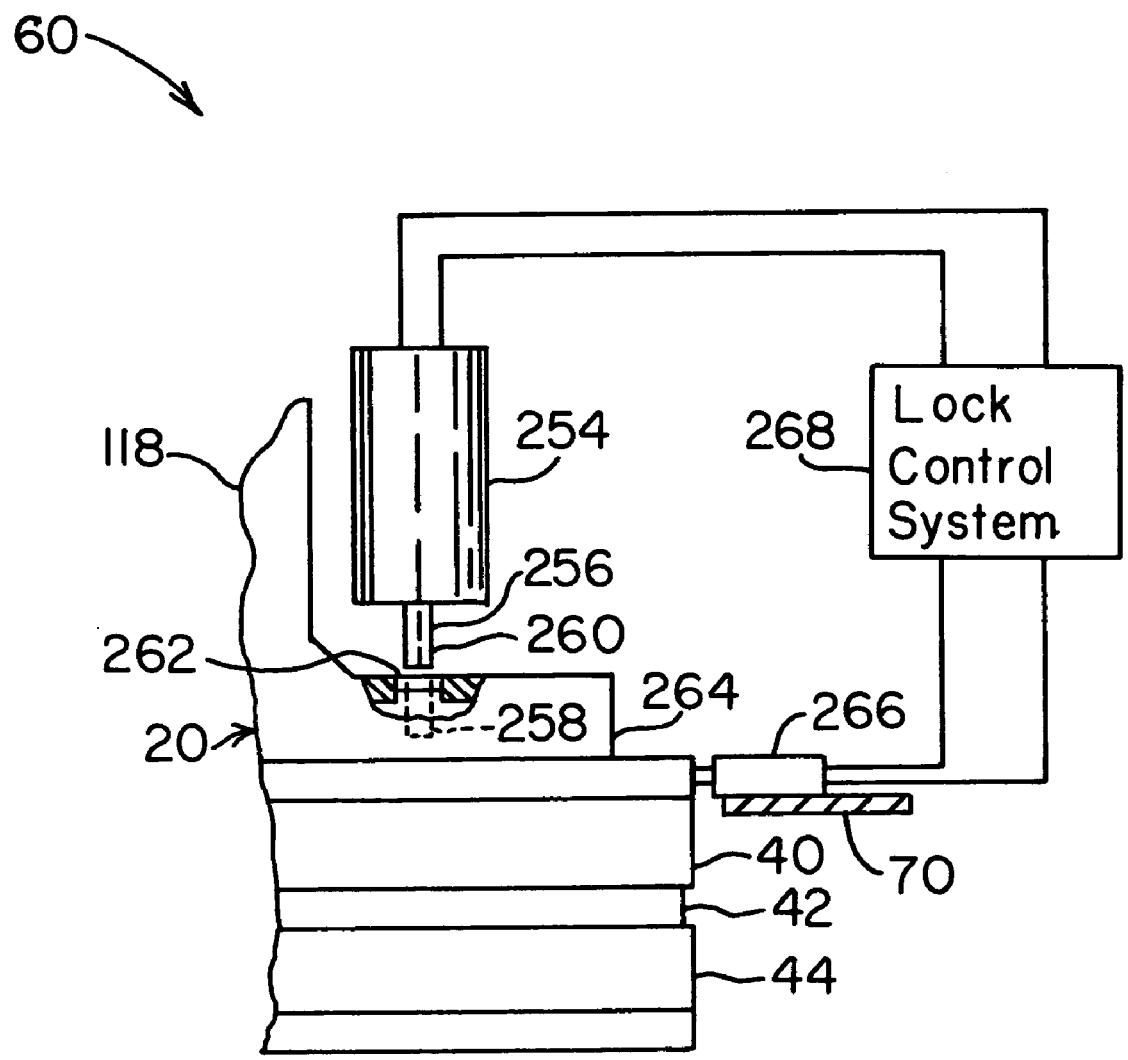
FIG. 20 is a side view in elevation of a lock assembly that may be used to secure the drawer in the retracted position within the data storage system.

It is generally preferred, but not required, that the data cartridge exchange apparatus 10 be provided with a drawer lock assembly or apparatus 60 (FIG. 20) that may be used either to hold the drawer 20 in the fully retracted position (i.e., with the first and second data cartridge storage locations 24 and 26 in their respective first and third positions 46 and 50) or to hold the second data cartridge storage location 26 stationary in its third position 50 when the first data cartridge storage location 24 is being moved. By keeping the second data cartridge storage location 26 stationary in its third position 50, the cartridge handling system 22 is able to access the data cartridges 18 within the second data cartridge storage location 26 even if the system operator has moved the first data cartridge storage location 24 and is accessing the data cartridges 18 therein. See FIG. 4.

The data cartridge exchange apparatus 10 may be used as follows to allow the system operator to access various data cartridges 18 contained within the data storage system 16. Consider, for example, a situation wherein the data storage system 16 has been provided with a plurality of data cartridges 18. During normal operation, the drawer 20 may remain in the fully retracted or closed position shown in FIG. 2, thereby allowing the cartridge handling system 22 internal to the data storage system 16 to access all of the data cartridges 18 contained therein. If the need arises for the system operator to access all of the data cartridges 18 within the fully closed drawer 20 (FIG. 2) (i.e., the first and second data cartridge storage locations 24 and 26 are in their respective first and third positions 46 and 50) and assuming that the first and second data cartridge storage locations 24 and 26 are engaged (e.g., guide rail 38 is secured to guide rail 40 by the lock assembly 58 shown in FIG. 17), the system operator may pull on a front panel 62 of drawer 20 to move the first and second data cartridge storage locations 24 and 26 outside the data storage system 16 and thereby expose the data cartridges 18 within the first and second data cartridge locations 24 and 26. See FIG. 3. If the data cartridge exchange apparatus 10 was provided with an optional drawer lock assembly 60 (FIG. 20), the drawer lock assembly 60 would first have to unlock the drawer 20 before the drawer 20 was moved.

Once the drawer 20 has been opened or extended, the system operator may access the exposed data cartridges 18 for the exchange, removal, or replacement of the same. While the drawer 20 is in the extended position, the data storage system 16 may remain operable and the cartridge handling system 22 may continue to access the data cartridges 18 stored in a "fixed" cartridge storage array 66. However, since all of the data cartridges 18 within drawer 20 were moved when the system operator opened the drawer 20, the fixed cartridge storage array 66 comprises only those data cartridges 18 not stored in drawer 20. In other words, the cartridge handling system 22 will not access any of the data cartridges 18 within the drawer 20.

After the system operator has finished accessing the exposed data cartridges 18, the system operator may push on the front panel 62 of drawer 20 to return the first and second data cartridge storage locations 24 and 26 to their respective first and third positions 46 and 50 within the data storage system 16. See FIG. 2. The drawer lock assembly 60 (FIG. 20) may then lock the drawer 20 in the fully closed position (i.e., lock the data cartridge storage locations 24 and 26 in their respective first and third positions 46 and 50). In this example, the data storage system 16 would need to re-inventory all of the data cartridges 18 within the drawer 20.

Assuming now that the system operator wants to access just the data cartridges 18 within the first data cartridge storage location 24, the first data cartridge storage location 24 would first have to be disengaged from the second data cartridge storage location 26. For example, in one embodiment, the lock assembly 58 (FIG. 17) would first have release the first guide rail 38 from the second guide rail 40 before the first data cartridge storage location 24 is moved. More specifically, and as will be explained in greater detail below, a lock control system 220 of lock assembly 58 may be instructed by a host computer system, a control system contained within the data storage system 16, and/or the system operator via a control panel 64 of the data storage system 16 to release the first and second guide rails 38 and 40. In response to the instructions, the lock control system may actuate a lock actuator 216 to release the first and second guide rails 38 and 40. Once the data cartridge storage locations 24 and 26 are disengaged, the system operator may pull on the front panel 62 to move the first data cartridge storage location 24 outside the data storage system 16 so that the data cartridges 18 within the first data cartridge storage location 24 are exposed to the system operator. See FIG. 4.

As the system operator is accessing the data cartridges 18 within the first data cartridge storage location 24, the data storage system 16 may remain operable and the cartridge handling system 22 may continue to access the data cartridges 18 stored in the fixed cartridge storage array 66. In this example, the second data cartridge storage location 26 remained stationary in its third position 46 as did the data cartridges 18 therein when the first data cartridge storage location 26 was moved. Consequently, the cartridge handling system 22 may continue to access the data cartridges 18 within the second data cartridge storage location 26, which may now be said to comprise a portion of the fixed cartridge storage array 66. In other words, only those data cartridges 18 that were moved and made accessible to the system operator (i.e., the data cartridges 18 within the first data cartridge storage location 24) were rendered inaccessible to the cartridge handling system 22.

After the user has finished accessing the first data cartridge storage location 24, the system operator may push on the front panel 62 to return the first data cartridge storage location 24 to its first position 46. See FIG. 2. The lock assembly 58 may then be used to secure the first guide rail 38 to the second guide rail 40. That is, in one embodiment, the lock control system 220 of lock assembly 58 may by instructed by the host computer system, the control system contained within the data storage system 16, and/or the system operator via the control panel 64 to secure the first guide rail 38 to the second guide rail 40. The lock control system 220 may then, in response, actuate the lock actuator 216 to secure the first guide rail 38 to the second guide rail 40 so that the first data cartridge storage location 24 may later be moved together with the second data cartridge storage location 26 and/or so that the first data cartridge storage location 24 is secured in its first position 46 by way of the drawer lock assembly 60 securing the second data cartridge storage location 26 in its third position 50. In this example, the data storage system 16 would need to re-inventory only the data cartridges 18 within the first data cartridge storage location 24.

It should be noted that any of the data cartridges 18 contained within the data storage system 16 may be accessed via the data cartridge exchange apparatus 10. For example, data cartridges 18 stored in the cartridge magazines 28 that are positioned in the fixed cartridge storage array 66 (FIG. 3) located opposite the drawer 20 also may be accessed by instructing the cartridge handling system 22 to move the selected data cartridges 18 from the fixed cartridge storage array 66 to a "movable" cartridge storage array 68 (e.g., the first and second data cartridge storage locations 24 and 26 when they are engaged are configured or engaged to be moved along with each other). After the selected data cartridges 18 have been transferred from the fixed cartridge storage array 66 to the movable cartridge storage array 68, the system operator may access the transferred data cartridges 18 in the manner already described.

A significant advantage of the present invention is that the data cartridge exchange apparatus 10 allows a system operator to access one or more of the data cartridges 18 within the drawer 20 (e.g., the data cartridges 18 within the first data cartridge storage location 24) without rendering all of the data cartridges 18 within the drawer 20 (e.g., the data cartridges 18 within the second data cartridge storage location 26) inaccessible to the cartridge handling system 22.

Having briefly described the data cartridge exchange apparatus 10, as well as some of its more significant features and advantages, the various embodiments of the data cartridge exchange apparatus according to the present invention will now be described in detail. However, before proceeding with the description, it should be noted that the data cartridge exchange apparatus 10 according to the present invention may be utilized in any of a wide range of data storage systems now known or that may be developed in the future for storing and accessing one or more data cartridges therein. Accordingly, the present invention should not be regarded as limited to the particular data storage system 16 shown and described herein. It should also be noted that while the data cartridge exchange apparatus 10 is shown and described herein as it could be used to store and retrieve magnetic data cartridges 18 having a standard size and configuration (e.g., digital linear tape or "DLT" cartridges), it is not limited to any particular type or style of data cartridge. Indeed, the data cartridge exchange apparatus 10 according to the present invention could be used with any type of data storage device comprising any type of data storage medium now known or that may be developed in the future. Consequently, the present invention should not be regarded as limited to use with the particular type and style of data cartridge 18 shown and described herein.

With the foregoing considerations in mind, one embodiment of the data cartridge exchange apparatus 10 is shown in FIG. 1 as it may be used in a data storage system 16 of the type used to store and access large amounts of data contained on one or more data cartridges 18. As mentioned earlier, the data storage system 16 may comprise any of a wide range of data storage systems now known in the art or that may be developed in the future for storing and accessing one or more data cartridges. Even though data storage systems are well-known in the art, a brief description of the data storage system 16 will be given in order to provide a more complete understanding of one environment in which may be used the data cartridge exchange apparatus 10.

Figure 5:
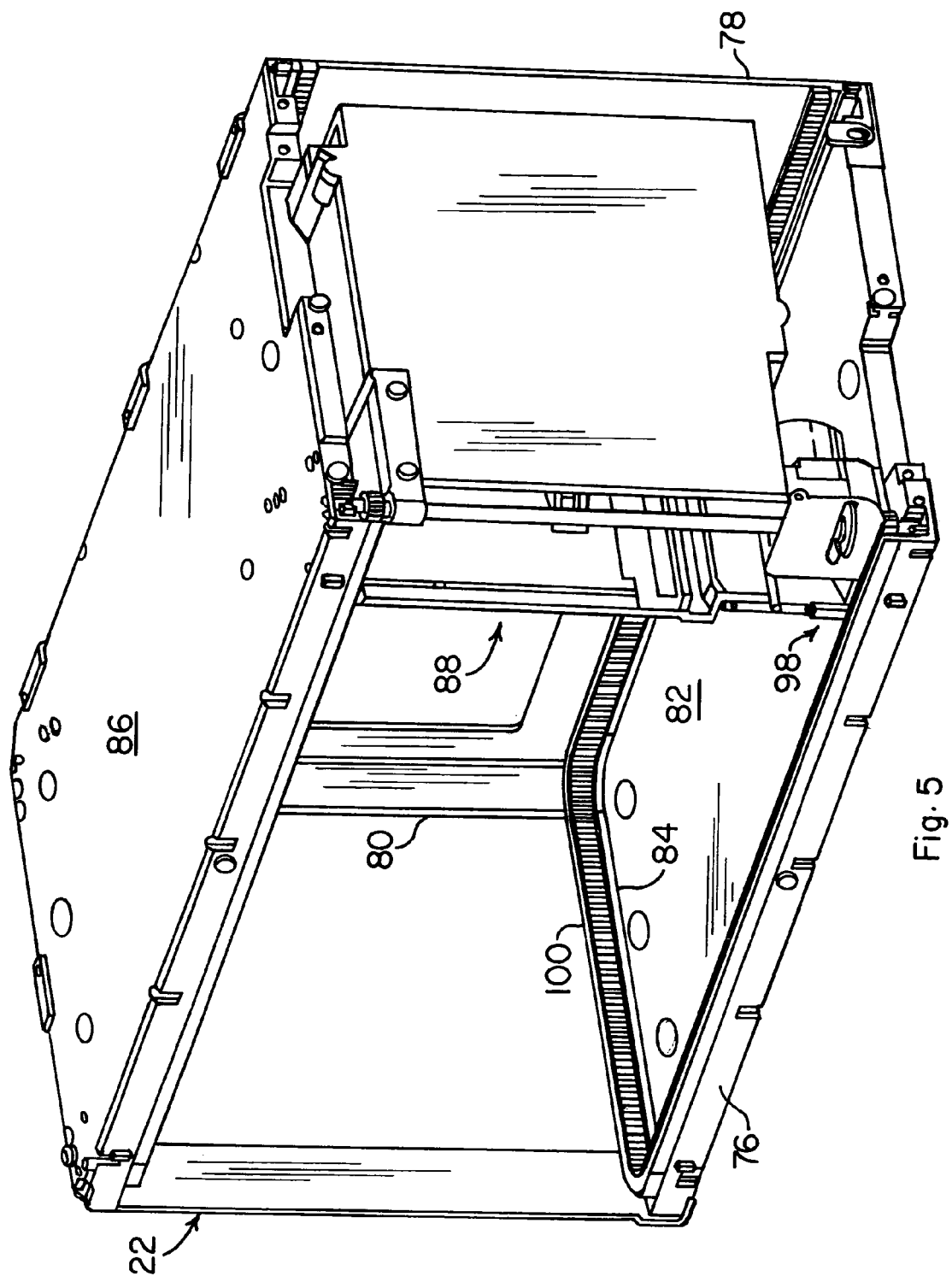
FIG. 5 is a perspective view of the cartridge handling system shown in FIG. 2.

Referring now primarily to FIGS. 2 and 5, the data storage system 16 in which may be used the data cartridge exchange apparatus 10 may comprise a main housing or chassis 70 configured to hold the various components of the data storage system 16, such as the data cartridge exchange apparatus 10, one or more cartridge receiving devices 72 (e.g., a cartridge magazine 28 or a cartridge read/write device 74) and the cartridge handling system 22. The housing 70 may also be adapted to receive any of a wide range of other components or devices (e.g., control systems, power supplies, etc.) well-known in the art and that may be required for the operation of the data storage system 16.

The data storage system 16 may be provided with the cartridge handling system 22 to transfer data cartridges 18 between one or more of the cartridge receiving devices 72, such as one or more cartridge magazines 28 and one or more cartridge read/write devices 74. The various cartridge receiving devices 72 may be positioned at various locations within the data storage system 16 so that they define a generally U-shaped configuration, as best seen in FIG. 2, although other configurations are possible. The cartridge handling system 22 may comprise a generally rectangularly shaped structure having a pair of opposed side portions 76 and 78 and an end portion 80. The fixed cartridge storage array 66 may be positioned adjacent the first side portion 76 of the cartridge handling system 22. See FIG. 3. The fixed cartridge storage array 66 may comprise any of a wide range of devices suitable for receiving one or more data cartridges 18. By way of example, in one preferred embodiment, the fixed cartridge storage array 66 may comprise a pair of cartridge magazines 28, each of which is configured to hold a plurality of data cartridges 18. In an alternative embodiment, the fixed cartridge storage array 66 may be replaced by a second drawer (not shown). Such an alternative configuration would allow the data cartridges 18 positioned adjacent the first side portion 76 to be accessed in substantially the same manner as the data cartridges 18 contained in the drawer 20 adjacent the opposed side portion 78.

The drawer 20 comprising the data cartridge exchange apparatus 10 may be mounted adjacent the second side portion 78 of the cartridge handling system 22. The drawer 20 may be configured to receive at least one data cartridge 18. By way of example, in one preferred embodiment, the drawer 20 is configured to receive a pair of cartridge magazines 28 (e.g., first and second magazines 30 and 32), each of which may be configured to hold a plurality of data cartridges 18. The drawer 20 and the data cartridges 18 stored therein together define the movable cartridge storage array 68 (FIG. 3) when the first and second data cartridge storage locations 24 and 26 are engaged. That is, in one embodiment, the movable cartridge storage array 68 includes both the first and second data cartridge storage locations 24 and 26 when the first guide rail 38 is secured to the second guide rail 40 by the lock assembly 58. However, the movable cartridge storage array 68 may only include the first data cartridge storage location 24 if the first and second guide rails 38 are 40 are not secured to one another and the first and second data cartridge locations 24 and 26 are not otherwise engaged. A pair of cartridge read/write devices 74 may be positioned adjacent the end portion 80 of the cartridge handling system 22 in the manner best seen in FIG. 2.

Figure 6:
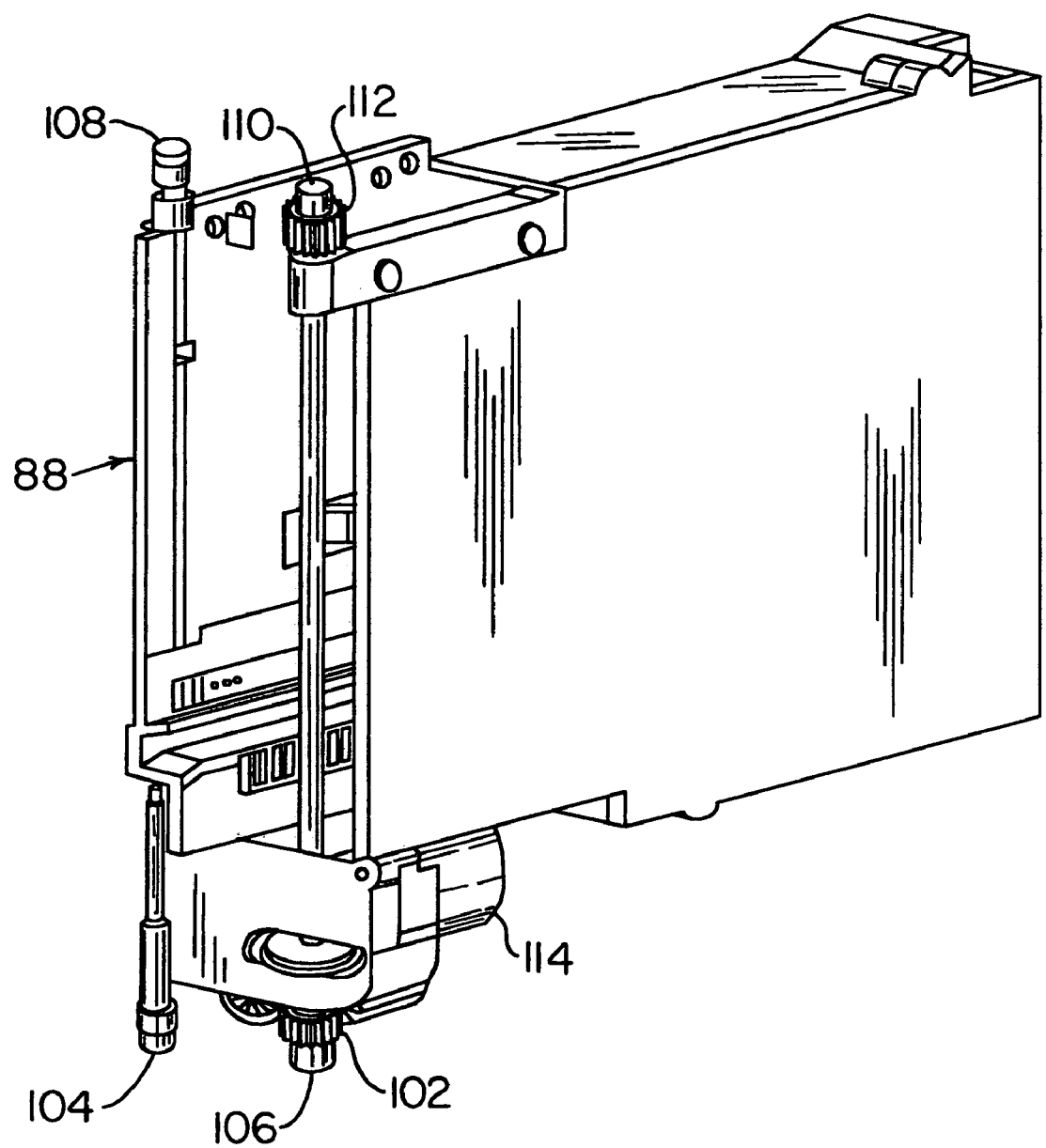
FIG. 6 is a perspective view of a cartridge access device that may be used in the cartridge handling system shown in FIG. 5.

The cartridge handling system 22 may further include a cartridge access device 88 that is best seen in FIG. 6. The cartridge access device 88 may comprise a portion of a cartridge positioning system 90 which moves the cartridge access device 88 to various positions (e.g., 92, 92', 92") along the various cartridge receiving devices 72 so that the cartridge access device 88 may access the data cartridges 18 contained therein. The cartridge access device 88 may also comprise a cartridge engaging assembly (not shown) suitable for loading and retrieving the data cartridges 18 into and from the various cartridge receiving devices 72. That is, the cartridge engaging assembly contained within the cartridge access device 88 is adapted to engage a data cartridge 18 contained in a cartridge receiving device 72 and to draw the data cartridge 18 into the cartridge access device 88. The cartridge engaging assembly is also adapted to load or insert the data cartridge 18 into a cartridge receiving device 72, e.g., either the cartridge magazines 28 or the cartridge read/write device 74, as the case may be. Stated simply, then, the cartridge engaging assembly is used to retrieve data cartridges 18 from, and insert them into, the various cartridge receiving devices 72. The cartridge access device 88, which includes the cartridge engaging assembly, is used to transport the data cartridges 18 to desired locations within the data storage system 16.

Referring now to FIGS. 2, 5, and 6, the cartridge access device 88 may be moved by an actuator system 98 along a lower U-shaped guide member or channel 84 and an upper U-shaped guide member or channel (not shown) provided on a respective lower and upper plate 82 and 86 of the cartridge handling system 22 in a generally U-shaped path 96 so that the cartridge access device 88 may access the data cartridges 18 contained in the various cartridge receiving devices 72. In one preferred embodiment, the actuator system 98 may comprise a rack and pinion drive system having a substantially continuous lower gear rack 100 provided on the lower plate 82 at a position adjacent the lower U-shaped guide member 84. Accordingly, the lower gear rack 100 defines a substantially continuous, U-shaped member. An upper gear rack (not shown) may be provided on the upper plate 86 at a position adjacent the upper U-shaped guide member and may also define a substantially continuous, U-shaped member. A lower pinion gear 102 may be mounted to the cartridge access device 88 so that it engages the U-shaped lower gear rack 100. A pair of lower bearing members 104, 106 mounted to the cartridge access device 88 are configured to be received by the lower U-shaped guide member or slot 84. The cartridge access device 88 may also be provided with a pair of upper bearing members 108, 110 and an upper pinion gear 112 which engage the upper U-shaped guide member and the upper U-shaped gear rack, respectively. A pinion drive assembly 114 mounted to the cartridge access device 88 is used to rotate the lower and upper pinion gears 102, 112 thereby moving the cartridge access device 88 along the lower guide member 84 and the upper guide member, following the generally U-shaped path 96. See FIG. 2.

The data storage system 16 may be connected to a host computer system (not shown) that issues commands to a control system (also not shown) contained within the data storage system 16. For example, in one operational sequence, the control system in response to commands from the computer system actuates the cartridge positioning system 90 which moves the cartridge access device 88 along the cartridge magazines 28 until it is positioned adjacent the desired data cartridge 18. The cartridge engaging assembly then removes the data cartridge 18 from the cartridge magazine 28 and draws it into cartridge access device 88. The cartridge access device 88 then transports the data cartridge 18 to the cartridge read/write device 74. The data cartridge 18 is inserted into the cartridge read/write device 74 so that the host computer may thereafter read data from or write data to the data cartridge 18. After the read/write operation is complete, the cartridge engaging assembly removes the data cartridge 18 from the cartridge read/write device 74 and draws it back into the cartridge access device 88 so that the data cartridge 18 may be returned to its appropriate location in the cartridge magazine 28.

Regardless of the particular type of data storage system 16 in which the data cartridge exchange apparatus 10 is used, the data cartridge exchange apparatus 10 according to the present invention may comprise the drawer 20 that is configured to receive one or more data cartridges 18. See FIGS. 2 and 7. The arrangement is such that the drawer 20 comprises the movable cartridge storage array 68 (FIG. 3) when the first and second data cartridge storage locations 24 and 26 are configured or engaged to be moved along with each other. The movable cartridge storage array 68 forms a part of the regular cartridge storage array of the data storage system 16 when the drawer 20 is in the fully retracted or closed position (i.e., with the first and second data cartridge storage locations 24 and 26 in their respective first and third positions 46 and 50, shown in FIG. 2). As used herein, the term "regular cartridge storage array" refers to both the fixed cartridge storage array 66 and the movable cartridge storage array 68. Put in other words, the drawer 20 comprises a cartridge receiving device 72 that is accessible to the cartridge handling system 22 so that the data cartridges 18 carried by the drawer 20 may be accessed by the cartridge handling system 22 during the normal or regular course of operation of the data storage system 16.

Before proceeding with the description, it should be noted that the data storage system 16 may be provided with any convenient number of drawers 20. For example, in the embodiment shown and described herein, the data storage system 16 is provided with a single drawer 20. Alternatively, the data storage system 16 may be provided with a second drawer (not shown). However, since each drawer assembly may be substantially identical, knowledge of the number of drawers that may be provided to a particular data storage system 16 is not required to understand and practice the present invention. Consequently, the remainder of the description will be directed to a data storage system 16 having only a single drawer 20.

Continuing now with the description, the drawer 20 utilized in one preferred embodiment of the invention may be formed by first and second cartridge magazine trays 116 and 118 which define the first and second data cartridge storage locations 24 and 26, respectively. See FIG. 7. Each of the data cartridge storage locations 24 and 26 may be configured to removably receive a cartridge magazine 28 (e.g., 30 and 32) in the manner best seen in FIG. 7. Each cartridge magazine 28 in turn may be configured to receive five (5) data cartridges 18, although cartridge magazines 28 configured to receive a greater number or lesser number of data cartridges 18 may also be used.

The first and second cartridge magazine trays 116 and 118 may each comprise generally rectangularly shaped members. More specifically, the first magazine tray 116 may comprise a floor section 120, a back surface 122, and an end wall 124. The various components 120, 122, and 124 of the first cartridge magazine tray 116 define the first data cartridge storage location 24. As explained in greater detail below, the floor section 120 may be mounted to the first guide rail 38.

The second cartridge magazine tray 118 may comprise a floor section 126, a back surface 128, and opposed end walls 130 and 132, which define the second data cartridge storage location 26. The floor section 126 may be to the second guide rail 40. The end wall 130 of the second magazine tray 118 may be provided with a spring biasing member (not shown) that may be used to urge the second cartridge magazine 32 against the second end wall 132. The end wall 124 of the first cartridge magazine tray 116 may also be provided with a spring biasing member 134 that may be used to urge the first cartridge magazine 30 against the end wall or center divider section 132 of the second cartridge magazine tray 118 when the data cartridge exchange apparatus 10 is in the first configuration 12 (i.e., with the trays 116 and 118 positioned adjacent one another).

The opposed sides of the center divider section 132 may each be provided with elongate rails 136 that are sized to engage slots or grooves 138 provided on the first and second cartridge magazines 30 and 32. See FIG. 7. The ends wall 124 of tray 116 and the end wall 130 of tray 118 may also each be provided with an elongate rail (not shown) sized to engage the slots 138 of the magazines 30 and 32, respectively. The slots 138 may engage the elongate rails 136 when the cartridge magazines 30 and 32 are positioned within the respective first and second data cartridge storage locations 24 and 26. Engaging the slots 138 with the elongate rails 136 helps prevent the cartridge magazines 30 and 32 from moving or shifting when the cartridge access device 88 inserts or removes data cartridges 18 into and from the cartridge magazine 30 and 32.

To orient and maintain the proper location of the first cartridge magazine 30 to the first cartridge magazine tray 116, the floor section 120 of tray 116 may be provided with a pin or rod 142 that is sized to engage an aperture or hole (not shown) provided on a bottom surface of the first cartridge magazine 30. In other words, engaging the pin 142 with the aperture of the first cartridge magazine 30 ensures that the first cartridge magazine 30 is guided or moved along with the first magazine tray 116 when the first magazine tray 116 is moved. Alternatively, other methods and arrangements are possible as would be obvious to persons having ordinary skill in the art after having become familiar with the teachings of the present invention.

The cartridge magazine trays 116 and 118 may be made from any of a wide range of materials, such as metals or plastics, suitable for the intended application. By way of example, in one preferred embodiment, the magazine trays 116 and 118 are molded as a single piece from a fiber reinforced polycarbonate plastic material. The cartridge magazines 28 (e.g., 30 and 32) may also be made from any of wide range of materials, depending on the requirements of the particular application. By way of example, the cartridge magazines 28 utilized in one preferred embodiment are also molded from a fiber reinforced polycarbonate plastic material.

Before proceeding with the description, it should be noted that in the embodiment shown and described herein, the first and second cartridge magazines 30 and 32 carried by the trays 116 and 118 forming drawer 20 are identical to the cartridge magazines 28 located adjacent the first side portion 76 of the cartridge handling system 22, although this is not necessary. Accordingly, the cartridge magazines 30 and 32 received by the drawer 20 comprise a cartridge receiving device 72 that is accessible to the cartridge handling system 22 during the normal or regular operation of the data storage system 16 (FIG. 2) (i.e., when the first and second data cartridge storage locations 24 and 26 are in their first and third positions 46 and 50, respectively). However, other arrangements are possible. For example, the drawer 20 could be configured to directly receive one or more data cartridges 18 (i.e., without the need for a separate cartridge magazine 28). In still another configuration, the drawer 20 could comprise a hybrid arrangement, with certain areas of the drawer 20 being configured to directly receive individual data cartridges 18 and with other areas of the drawer 20 being sized to receive a cartridge magazine or magazines 28 (e.g., cartridge magazine 30 or 32). Consequently, the present invention should not be regarded as limited to the particular configuration of the drawer 20 shown and described herein.

The drawer 20 may also be provided with a front panel member or bezel 62. See FIG. 1. The front panel member 62 may be attached directly to the first guide rail 38 of the mounting system 36 which is used to mount the drawer 20 to the data storage system 16. Alternatively, the front panel member 62 may be attached to the first magazine tray 116 or may comprise an integral portion of the first magazine tray 116. The front panel member 62 forms a part of the front panel or bezel 144 of the data storage system 16 when the drawer 20 is in the fully retracted position (i.e., first and second data cartridge storage locations 24 and 26 are positioned within the housing 70 of data storage system 16 in their respective first and third positions 46 and 50). The front panel member 62 also provides a convenient means for allowing the system operator to manually pull open the drawer 20.

The first and second data cartridge storage locations 24 and 26 may be operatively associated so that they may be moved along with each other as a single unit. The first and second data cartridge storage locations 24 and 26, however, may also be movable with respect to each other so that the data cartridge exchange apparatus 10 defines a plurality of configurations (e.g., the first configuration 12 and the second configuration 14). That is, in the embodiment shown and described herein, the system operator may reconfigure the data cartridge exchange apparatus 10 by moving the first data cartridge storage location 24 either toward or away from the second data cartridge storage location 26. For example, the system operator may position the first and second data cartridge storage locations 24 and 26 adjacent one another thereby defining the first configuration 12 for the data cartridge exchange apparatus 10. See FIGS. 2, 3 and 7. Alternatively, the system operator may separate the first and second data cartridge storage locations 24 and 26 by the spaced distance 34 thereby defining the second configuration 14 for the data cartridge exchange apparatus 10. See FIG. 4. It is generally preferred, but not required, that the spaced distance 34 be dimensioned large enough so that the data cartridges 18 within the second data cartridge storage location 26 are able to remain stationary within the data storage system 16 (e.g., the third position 50) even though the data cartridges 18 within the first data cartridge storage location 24 are moved to a position (e.g., the second position 48) outside the housing 70 of data storage system 16.

To allow the system operator to access the first and second cartridge magazines 30 and 32 when positioned within the first and second data cartridge storage locations 24 and 26, respectively, the data cartridge exchange apparatus 10 may be operatively associated with the data storage system 16 so that the first and second data cartridge storage locations may be moved into and out of the housing 70 of data storage system 16. In the embodiment shown and described herein, the first and second cartridge magazine trays 116 and 118, forming drawer 20, may be slidably mounted to the chassis 70 of data storage system 16 by the mounting system 36.

The mounting system 36 that may be used to mount the drawer 20 to the data storage system 16 may comprise a first guide rail 38 mounted to the first cartridge magazine tray 116, a second guide rail 40 mounted to the second cartridge magazine tray 118, a third guide rail 42 sized to engage the first and second guide rails 38 and 40, and a fourth guide rail 44 mounted to the chassis 70 of data storage system 16. See FIGS. 7–16. The first and second guide rails 38 and 40 may each be mounted in sliding engagement with the third guide rail 42, which in turn may be mounted in sliding engagement with the fourth guide rail 44. The sliding engagement of the various rails 38, 40, 42, and 44 allows the drawer 20 (i.e., both data cartridge storage locations 24 and 26) to be slidably moved between the retracted position (FIG. 2) and the extended or open position (FIG. 3). More specifically, the sliding engagement of the various rails 38, 40, 42, and 44 allows the first cartridge magazine tray 116 to be slidably moved generally in the directions indicated by arrows 54 and 56 between the first and second positions 46 and 48 and also allows the second cartridge magazine tray 118 to be slidably moved generally in the directions indicated by arrows 54 and 56 between the third and fourth positions 50 and 52. See FIGS. 2 and 3. As mentioned earlier, the first and third positions 46 and 50 may each be located within the data storage system 16 so that the data cartridges 18 within the first and second data cartridge storage locations 24 and 26 are within the data storage system 16 when the first and second data cartridge storage locations 24 and 26 are in their respective first and third positions 46 and 50. See FIG. 2. The second and fourth positions 48 and 52 may be located outside the data storage system 16 so that the data cartridges 18 within the first and second data cartridge storage locations 24 and 26 are exposed to the system operator when the first and second data cartridge storage locations 24 and 26 are in their respective second and fourth positions 48 and 52. See FIG. 3.

Figure 9:
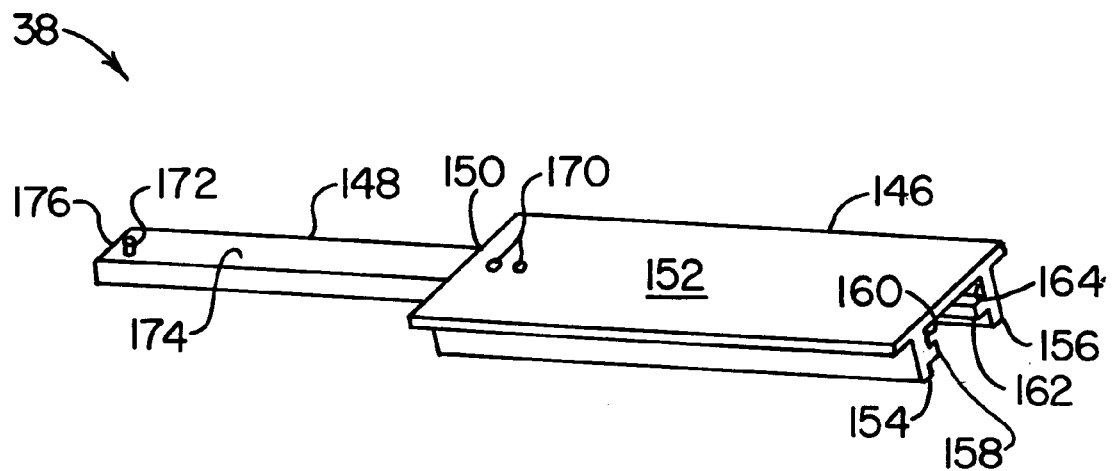
FIG. 9 is a perspective view of the first guide rail of the mounting system shown in FIG. 8.

The first guide rail 38 is best seen in FIG. 9 and may comprise a first elongate member 146 and a second elongate member 148. The second elongate member 148 may be mounted to and extend outwardly from an end portion 150 of the first elongate member 146. Alternatively, the first guide rail 38 may comprise a single member (not shown).

The first elongate member 146 of guide rail 38 may include a back portion 152 from which extend a pair of flanges 154 and 156. A first bearing track 158 extends generally outwardly from the flange 154 and, together with the flange 154 and back portion 152, defines a first channel 160. Similarly, a second bearing track 162, extends generally outwardly from the flange 156 and, together with flange 156, defines a second channel 164. The two bearing tracks 158 and 162 are substantially parallel to the back member 152.

The second elongate member 148 of first guide rail 38 may comprise a generally rectangular cross-section sized to be received within the third guide rail 42, although other shapes are possible. See FIGS. 9 and 15. The second elongate member 146 may further include a stop pin 172 mounted on an upper surface 174 of member 146 adjacent an end portion 176 of the second elongate member 146. The stop pin 172 may be sized to fit within an elongate slot 178 defined by the third guide rail 42. The stop pin 172 when engaged with the elongate slot 178 limits the extent to which the first guide rail 38 may be extended with respect to the third guide rail 42. The second elongate member 148 may be mounted to the end 150 of the first elongate member 146 with any of a wide range of fasteners 170 (e.g., screws, rivets, adhesives, etc.), suitable for the intended application.

Figure 13:
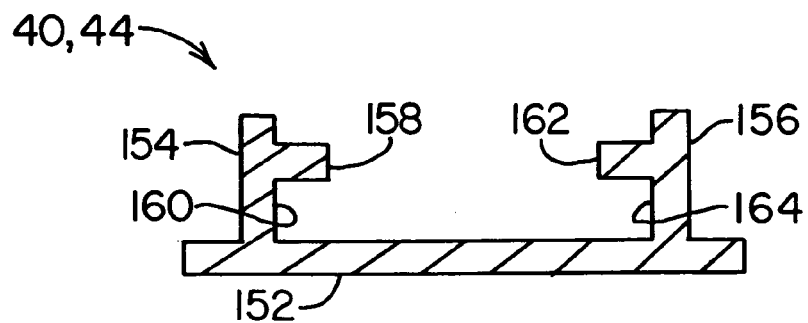
FIG. 13 is a cross sectional view in elevation of the second and fourth guide rail taken along the line 13—13 of FIG. 11.

The second and fourth guide rails 40 and 44 are best seen in FIGS. 11 and 13 and may each have a configuration that is substantially identical to the configuration of the first elongate member 146 of first guide rail 38. More specifically, the second and fourth guide rails 40 and 44 may each include a back portion 152 from which extend a pair of flanges 154 and 156. A first bearing track 158 extends generally outwardly from the flange 154 and, together with the flange 154 and back portion 152, defines a first channel 160. Similarly, a second bearing track 162 extends generally outwardly from the flange 156 and, together with flange 156, defines a second channel 164. The two bearing tracks 158 and 162 are substantially parallel to the back member 152, as best seen in FIG. 13. A pair of U-shaped bearing members 166 may be provided within the channels 160 and 164 of the second and fourth guide rails 40 and 44 at substantially the proximal end 168 of the second and fourth guide rails 40 and 44. See FIG. 11.

Figure 10:
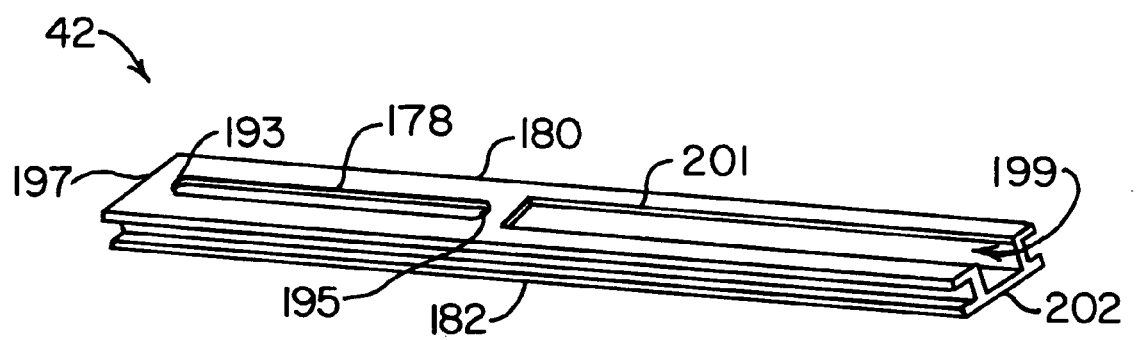
FIG. 10 is a perspective view of the third guide rail of the mounting system shown in FIG. 8.
Figure 14:
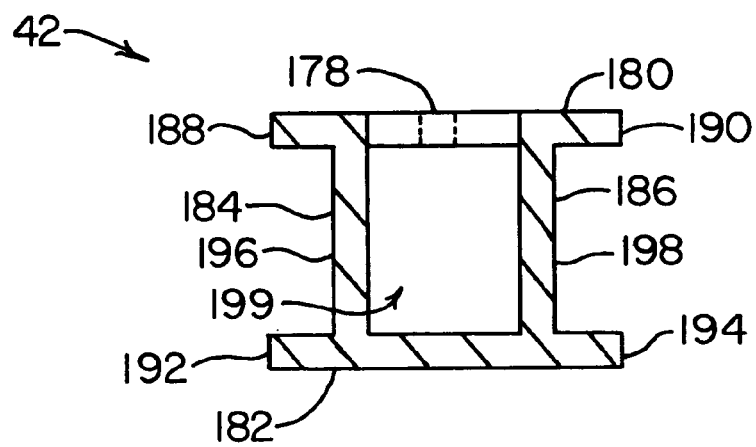
FIG. 14 is a cross sectional view in elevation of the third guide rail taken along the line 14—14 of FIG. 12.

The third guide rail 42 is best seen in FIGS. 10, 12 and 14 and may comprise a pair of elongate bearing guide members 180 and 182 held in substantially parallel-spaced apart relation by a pair of flange members 184 and 186. The portions of first bearing guide member 180 that are outboard of the flange members 184 and 186 form bearing tracks 188 and 190. Similarly, the portions of the second bearing guide member 182 that are outboard of the flanges 184 and 186 form bearing tracks 192 and 194. The guide members 180 and 182, together with the first and second flange members 184 and 186, define respective first and second channels 196 and 198.

The first bearing guide member 180 may define the elongate slot 178 that is sized to receive the stop pin 172. The location of the elongate slot 178 is such that the stop pin 172 provided on the second elongate member 148 of first guide rail 38 will come into abutting contact with a proximal end 193 of the elongate slot 178 when the rails 38, 40, 42, and 44 are in the fully retracted position. Conversely, the stop pin 172 will come into abutting contact with a distal end 195 of the slot 178 when the first rail 38 is in a fully extended position with respect to the third guide rail 40. The foregoing arrangement prevents the system operator from inadvertently pulling the first magazine tray 116 beyond the fully extended position (i.e., second position 48) and thereafter possibly pulling apart or separating the first guide rail 38 from the third guide rail 42.

The first and second bearing guide members 180 and 182, together with the flanges 184 and 186, may define an interior pathway 199 sized to receive the second elongate member 148 of first guide rail 38. The pathway 199 may include a channel portion 201 that is defined by the second bearing guide member 182 and the flanges 184 and 186. The channel portion 201 may extend longitudinally from a distal end 202 of the third guide rail 42 to about a center region 200 of the third guide rail 42. When the second elongate member 148 of the first guide rail 38 is engaged with the pathway 199, the second elongate member 148 helps guide the first rail 38 when it is being extended or moved along the third guide rail 42.

The bearing guide members 180 and 182 of guide rail 42 may be provided with a plurality of U-shaped bearing members 166 located substantially in the positions shown in FIG. 12. More specifically, a total of four bearings 166 may be affixed to the lower bearing tracks 192 and 194: Two bearings 166 at about the proximal end 197, and two bearings 166 at about the center region 200 of guide rail 42. Similarly, a total of four bearings 166 may be affixed to the upper bearing tracks 188 and 190: Two bearings 166 at about the center region 200 and two bearings 166 at about the distal end 202 of guide rail 42.

The guide rails 38, 40, 42, and 44 may be made from any of a wide range of materials (such as metals or plastics) suitable for the intended application. Consequently, the present invention should not be regarded as limited to guide rails being fabricated from any particular material. By way of example, in one preferred embodiment, the guide rails 38, 40, 42, and 44 are formed from extruded aluminum. The bearing members 166 may also be made from a wide range of materials suitable for providing a low friction sliding engagement with the guide rails 38, 40, 42, and 44. By way of example, in the embodiment shown and described herein, each bearing member 166 is molded as a single piece of polythalamide plastic. Alternatively, other types of bearings, such as wheels or rollers, could be substituted for the sliding bearings 166 shown and described herein.

Figure 8:
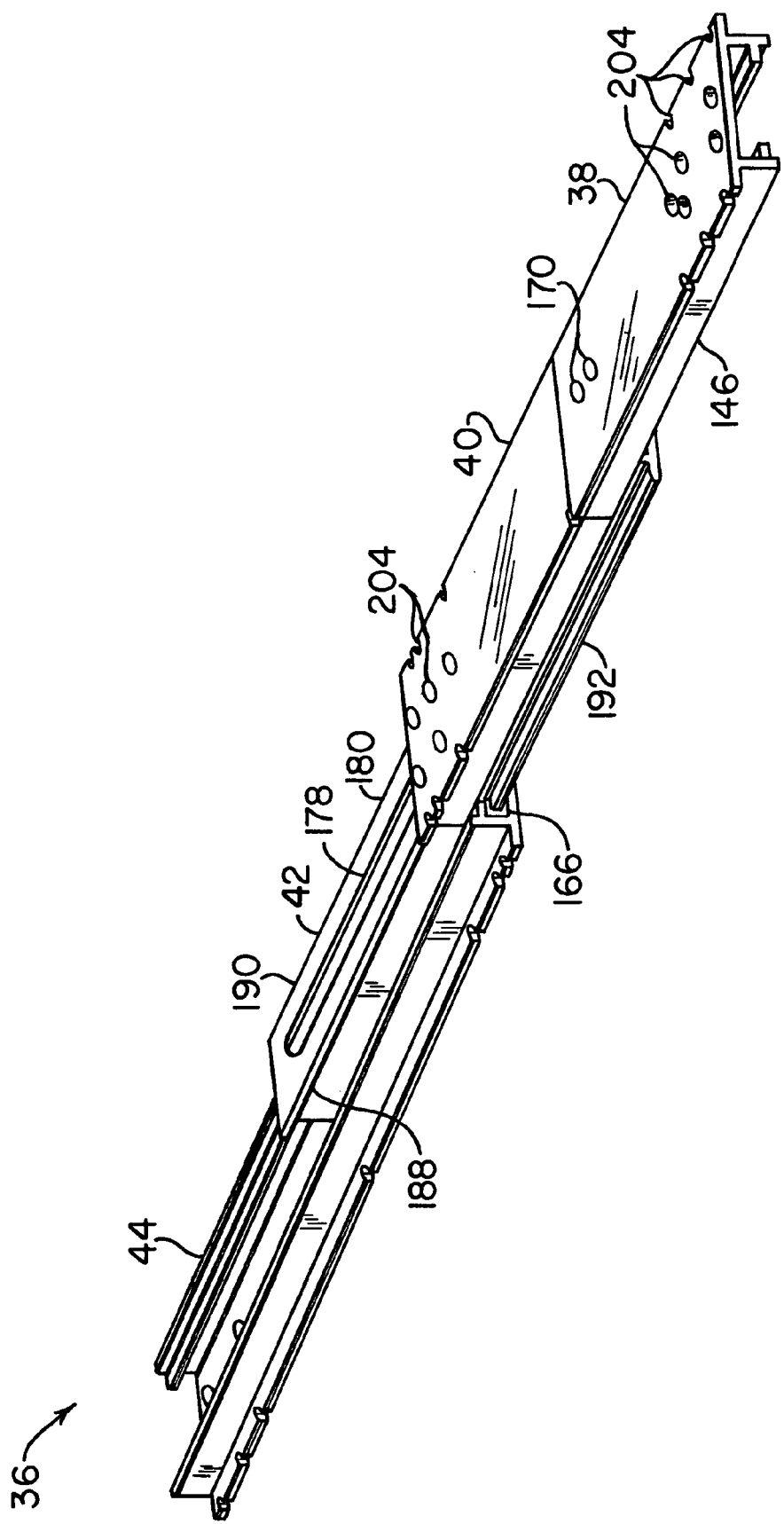
FIG. 8 is a perspective view of the mounting system that may be used to slidably mount the drawer to the data storage system.
Figure 15:
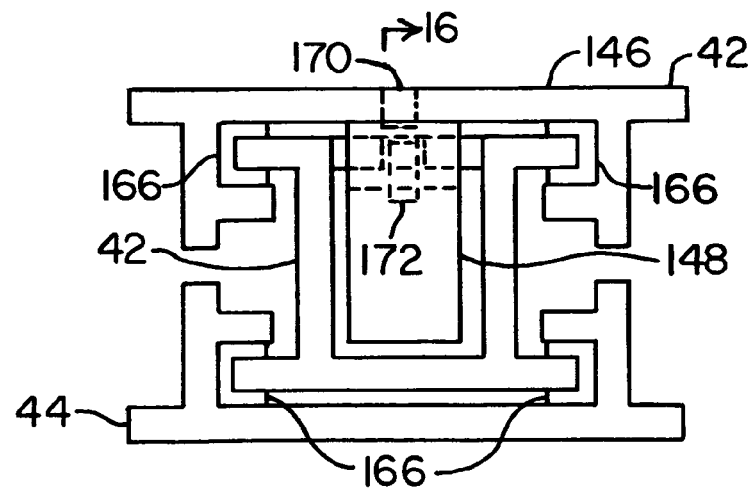
FIG. 15 is an end view in elevation of the guide rails comprising the mounting system.
Figure 16:
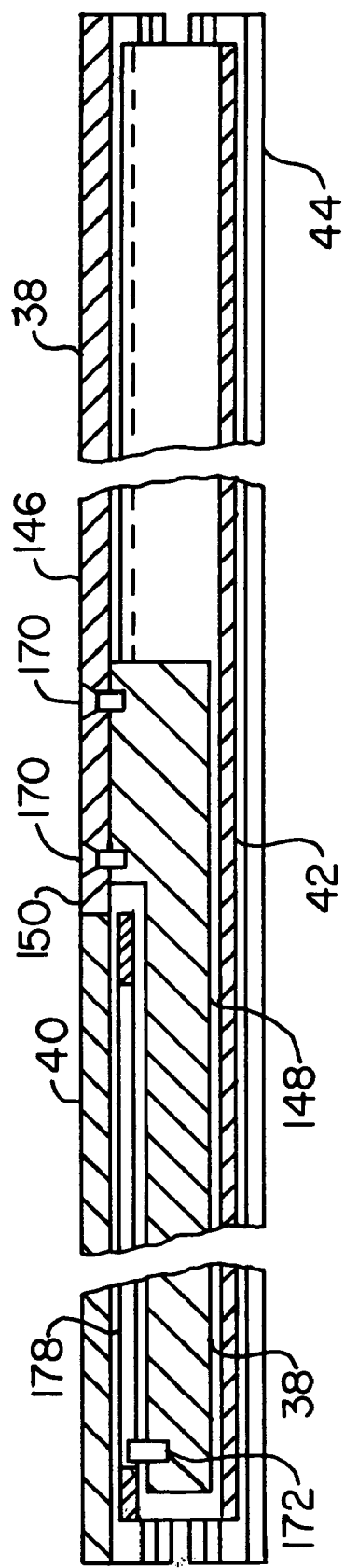
FIG. 16 is a cross sectional view in elevation of the of the guide rails comprising the mounting system taken along the line 16—16 of FIG. 15.

The various guide rails 38, 40, 42, and 44 may be slidably engaged with one another in the manner best seen in FIGS. 8, 15 and 16. That is, the channels 160 and 164 of the second guide rail 40 and of the first elongate member 146 of the first guide rail 38 receive the bearing members 166 mounted to the bearing guide member 180 of the third guide rail 42. The channels 160 and 164 of the fourth guide rail 40 receive the bearing members 166 mounted to the bearing guide member 182 of the third guide rail 42. The U-shaped bearings 166 located in the channels 160 and 164 of the second and fourth guide rails 40 and 42 engage the bearing guide members 180 and 182, respectively, of the third guide rail 42.

The locations of the U-shaped bearings 166 on the second, third and fourth guide rails 40, 42, and 44 are such that the U-shaped bearings 166 located in the channels 160 and 164 of the second and fourth guide rails 40 and 42 will come into abutting contact with the U-shaped bearing members 166 affixed to the bearing guide members 180 and 182, respectively, of the third guide rail 42 when the rails 38, 40, 42, and 44 are in the fully extended position illustrated in FIG. 8. More specifically, the bearings 166 located on the lower or fourth guide rail 44 will come into abutting contact with the bearings 166 on the lower bearing tracks 192 and 194 that are located in the center region 200 of the third guide rail 42. Similarly, the bearings 166 located on the second guide rail 40 will come into abutting contact with the bearings 166 on the upper bearing tracks 188 and 190 that are located in the center region 200 of the third guide rail 42. The foregoing bearing arrangement prevents the system operator from inadvertently pulling the first and second cartridge magazine trays 116 and 118, forming drawer 20, beyond their extended positions (i.e., second and fourth positions 48 and 52) and thereafter possibly pulling apart or separating the second, third and fourth guide rails 40, 42 and 44.

Referring now to FIG. 8, the first elongate member 146 of first guide rail 38 and the second guide rail 40 may each be provided with one or more mounting holes or slots 204 to allow the respective first and second cartridge magazine trays 116 and 118 to be mounted thereupon. The fourth guide rail 44 may also be provided with one or more mounting holes or slots 204 to allow the fourth guide rail 44 to be mounted to the chassis 70 of data storage system 16. For example, in one preferred embodiment, the fourth guide rail 44 is mounted directly to the chassis 70 of data storage system 16 by a plurality of screws (not shown). Similarly, the cartridge magazine trays 116 and 118 may be mounted directly to the first and second guide rails 38 and 40, respectively, also by a plurality of screws (not shown). Alternatively, other types of fasteners now known in the art or that may be developed in the future may be used to mount the fourth guide rail 44 to the chassis 70 and to mount the cartridge magazine trays 116 and 118 to the respective first and second guide rails 38 and 40.

To allow the first and second data cartridge storage locations 24 and 26 to either be moved along with each other (i.e., as a single unit) or individually with respect to the other (i.e., as separate units), the first and second guide rails 38 and 40 may be releasably engaged with one another. That is, the first and second data cartridge storage locations 24 and 26 may be movable as one unit when the guide rails 38 and 40 are engaged but may be movable with respect to each other when the guide rails 38 and 40 are disengaged and the first and second data cartridge storage locations 24 and 26 are not otherwise engaged. For example, in one embodiment, the lock assembly 58 (FIG. 17) may be provided that is usable to secure the first guide rail 38 to the second guide rail 40. With the first and second guide rails 38 and 40 secured to each other by the lock assembly 58, the first data cartridge storage location 24 may be moved together with the second data cartridge storage location 26. In other words, the first and second data cartridge storage locations 24 and 26 may both be positioned outside the data storage system 16 when the drawer 20 is opened. However, when the first and second guide rails 38 and 40 are not secured to each other and the first and second data cartridge storage locations 24 and 26 are not otherwise engaged, the first data cartridge storage location 24 may be moved independently from the second data cartridge storage location 26, and the system operator is able to position the first data cartridge storage location 24 outside the data storage system 16 without moving the second data cartridge storage location 26 from its third position 50 within the data storage system 16. By doing so, the system operator will be able to access the data cartridges 18 positioned within the first data cartridge storage location 24 without rendering the data cartridges 18 within the second data cartridge storage location 26 inaccessible to the data storage system 16.

Figure 17:
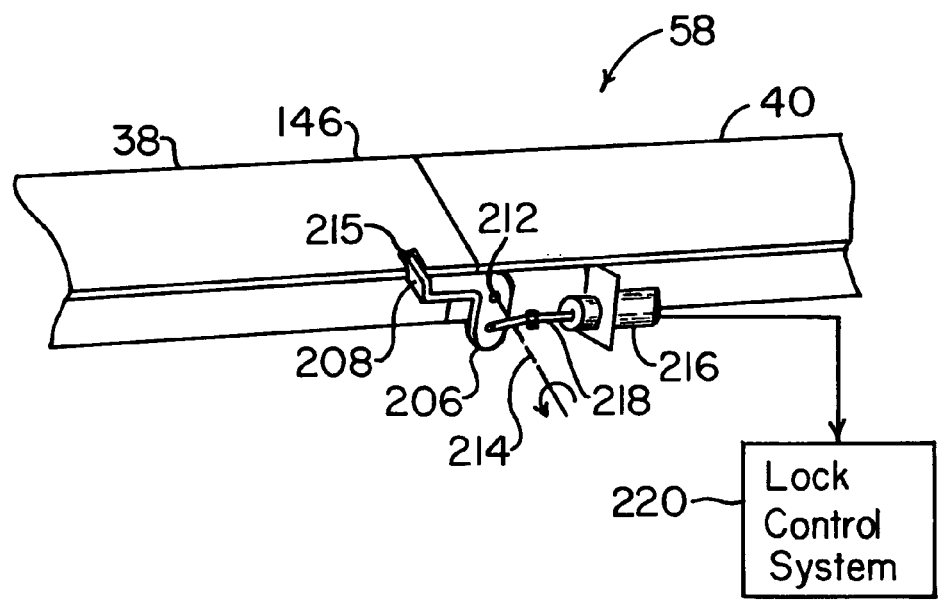
FIG. 17 is a perspective view of a lock assembly that may be used to secure the first guide rail to the second guide rail.

The lock assembly 58 utilized in one preferred embodiment may comprise a lock member or latch pawl 206 that is movable between a locked position 208 and an unlocked position (not shown). As shown in FIG. 17, the lock member 206 may secure the first guide rail 38 to the second guide rail 40 when the lock member 206 is in the locked position 208. The lock member 206 may be provided with a suitable biasing device, such as a spring (not shown), to bias the latch pawl 206 in the locked position 208. The latch pawl 206 may be pivotally mounted to the second guide rail 40 with a pawl pivot 212 so that the latch pawl 206 may be rotated or pivoted about axis 214 between the locked position 208 and the unlocked position. Alternatively, other mounting arrangements are possible.

The latch pawl 206 may be sized to engage a notch 215 provided on the first elongate member 146 of the first guide rail 38. When the latch pawl 206 is in the locked position 208, the latch pawl 206 is engaged with the notch 215 and thus secures the first guide rail 38 to the second guide rail 40.

The lock member 206 may be fabricated from any of a wide range of materials suitable for the intended application. By way of example, in one preferred embodiment, the lock member 206 is fabricated from sheet metal, although other materials could be used.

A lock actuator 216 may be also be mounted to the second guide rail 40 and be used to pivot the latch pawl 206 about axis 214 between the locked position 208 to the unlocked position. By way of example, in one preferred embodiment, the lock actuator 216 is provided with a plunger 218 that is operatively associated with the latch pawl 206. That is, the lock actuator 212 moves the plunger 214, which in turn pivots the latch pawl 206 about axis 214.

A lock control system 220 may be provided that is used to operate the lock actuator 216. The lock control system 220 may be responsive to the host computer system, the control system contained within the data storage system 16, and/or the system operator via the control panel 64 and may receive commands therefrom to actuate the lock actuator 216 and release the first and second guide rails 38 and 40.

The various components of the lock assembly 58 may comprise any of a wide range of devices and systems well-known in the art and that are readily commercially available. For example, the lock actuator 216 may comprise an electrically operated solenoid having a plunger 218 operatively associated with the latch pawl 206. In the embodiment shown and described herein, the latch pawl 206 is biased in the locked position 208 by a suitable spring (not shown). Consequently, energizing the solenoid will pull or move the plunger 218 which in turn rotates the latch pawl 206 about the axis 214 to the unlocked position thus releasing the first guide rail 38 from the second guide rail 40. Of course, other types of components and operating arrangements could also be used, as would be obvious to persons having ordinary skill in the art.

Figure 18:
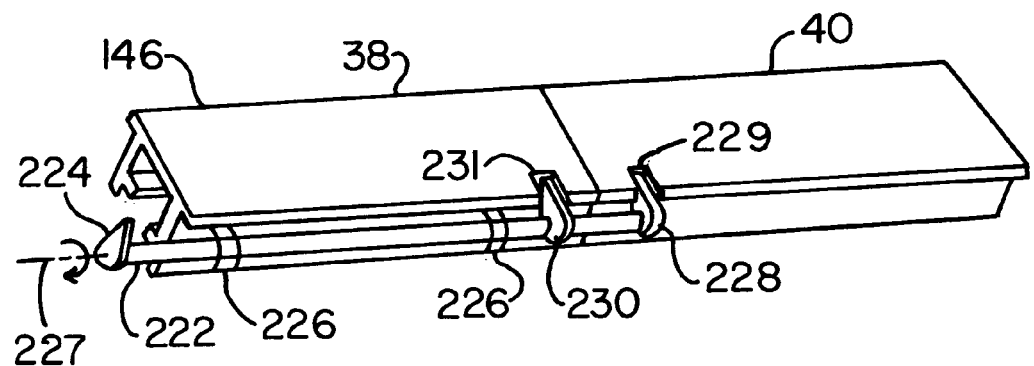
FIG. 18 is a perspective view of an arm and finger assembly that may be used to secure the first guide rail to the second guide rail in a second embodiment of the data cartridge exchange apparatus.

In an alternative embodiment, an arm assembly or elongate member 222 may be provided that is movably mounted to the first elongate member 146 of the first guide rail 38 so that the arm assembly 222 may be moved between a locked position 224 and an unlocked position (not shown). See FIG. 18. More specifically, in one preferred embodiment, the arm assembly 222 is mounted to the first elongate member 146 of the first guide rail 38 with rail supports 226 so that the arm assembly 222 may be rotated about an axis 227 between the locked position 224 and the unlocked position. The arm assembly 222 may be provided with a first finger assembly or cam 228 that is sized to engage a first notch 229 provided on the second guide rail 40. The arm assembly 222 may also be provided with a second finger assembly or cam 230 that is sized to engage a second notch 231 provided on the first elongate member 146 of the first guide rail 38. The first and second finger assemblies 228 and 230 engage the first and second notches 229 and 231, respectively, when the arm assembly 222 is in the locked position 224 to secure the first guide rail 38 to the second guide rail 40.

Figure 19:
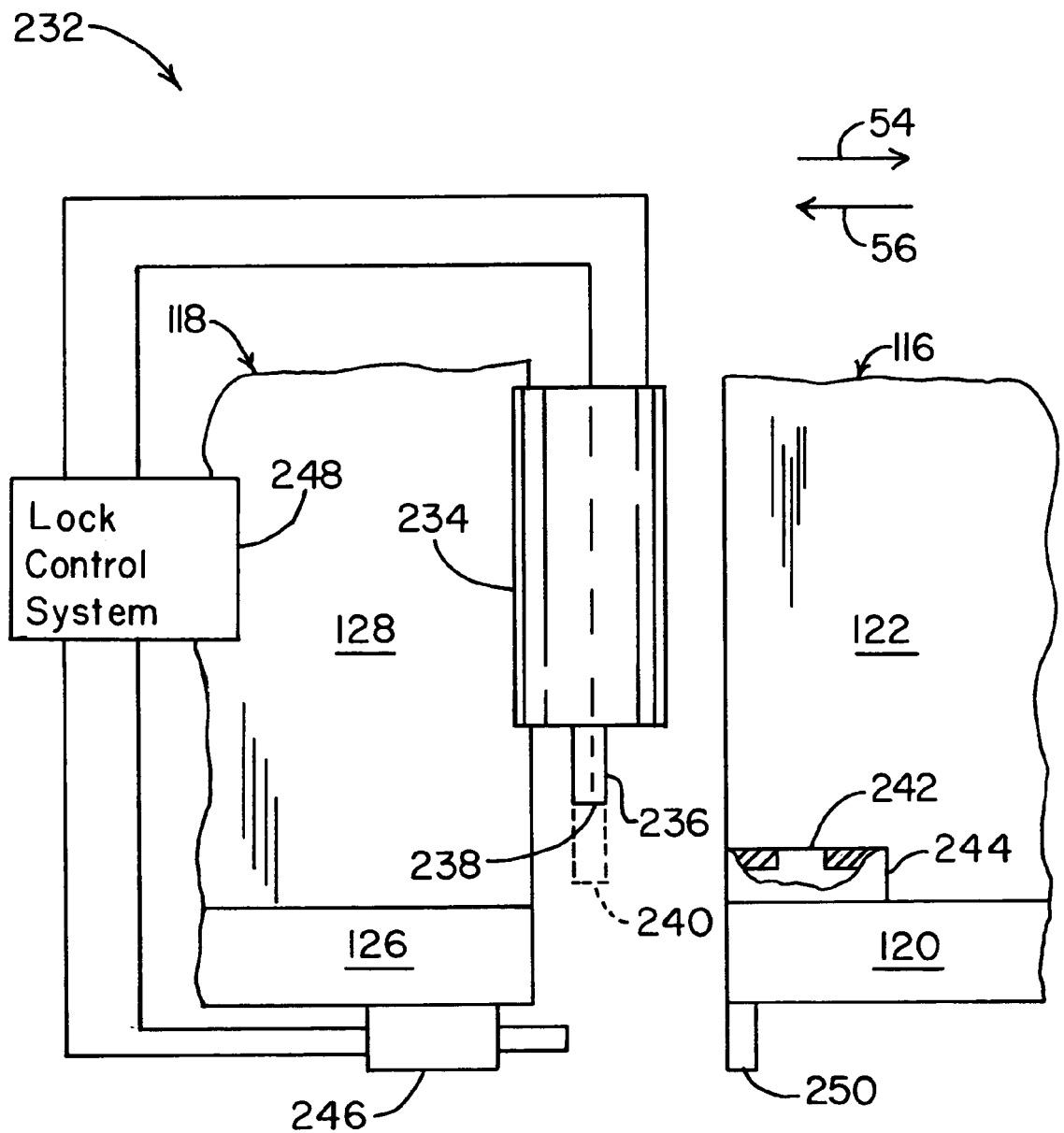
FIG. 19 is a side view in elevation of a lock assembly that may be used to engage the first and second cartridge magazine trays of the drawer in a third embodiment of the data cartridge exchange apparatus.

In yet another alternative, the data cartridge storage locations 24 and 26 themselves may be releasably engaged with one another instead of being engaged by way of the engagement of the first and second guide rails 38 and 40. For example, in one embodiment, a lock assembly or apparatus 232 (FIG. 19) may be provided that is usable to releasably engage the first and second data cartridge storage locations 24 and 26. More specifically, the lock assembly 232 utilized in one preferred embodiment may comprise a lock actuator 234 for moving a lock bolt or plunger 236 between an unlocked position 238 and a locked position 240. A spring (not shown) may be used to bias the lock bolt 236 in the unlocked position 238. The lock bolt 236 is sized to engage at least one aperture 242 provided in a lock plate 244. A limit switch 246 operatively associated with the first and second data cartridge storage locations 24 and 26 may be provided that detects when the first and second data cartridge storage locations 24 and 26 are positioned adjacent (e.g., in the first and third positions 46 and 50) and then sends a signal to a lock control system 248. In response, the lock control system 248 may operate the lock actuator 234 to secure the first data cartridge storage location 24 to the second data cartridge storage location 26. Alternatively, the lock control system 248 may operate the lock actuator 234 in response to instructions entered by the system operator into the host computer system or the control panel 64 of the data storage system 16.

The lock plate 244 may comprise a portion of or be mounted on the first cartridge magazine tray 116 with the lock actuator and bolt 234, 236 being provided on the second cartridge magazine tray 118. The limit switch 246 may be mounted underneath the floor section 126 of second tray 118 and be substantially aligned with a member 250 extending downwardly from the floor section 120 of first tray 116. Alternatively, other mounting arrangements are possible as would be obvious to persons having ordinary skill in the art after having become familiar with the teachings of the present invention.

The various components of the lock assembly 232 may comprise any of a wide range of devices and systems well-known in the art and that are readily commercially available. For example, the lock actuator 234 may comprise an electrically operated solenoid having a plunger 236 sized to engage the hole 242 provided in lock plate 244. The lock bolt 236 may be biased in the unlocked position 238 by a suitable spring (not shown) such that energizing the solenoid will move the lock bolt 236 to the locked position 240 thus releasably engaging the first and second data cartridge storage locations 24 and 26. Of course, other types of components and operating arrangements could also be used, as would be obvious to persons having ordinary skill in the art.

As mentioned briefly above, it is generally preferred, but not required, that the data cartridge exchange apparatus 10 be provided with a drawer lock assembly or apparatus 60 (FIG. 20) to hold the drawer 20 in the fully retracted position (FIG. 2) when the first and second data cartridge storage locations 24 and 26 are engaged or to hold the second data cartridge storage location 26 stationary in its third position 50 when the first data cartridge storage location 24 is being moved. By keeping the second data cartridge storage location 26 stationary in its third position 50, the cartridge handling system 22 is able to access the data cartridges 18 within the second data cartridge storage location 26 even if the system operator has moved the first data cartridge storage location 24 and is accessing the data cartridges 18 therein. See FIG. 4.

The drawer lock assembly 60 utilized in one embodiment may comprise a lock actuator 254 for moving a lock bolt or plunger 256 between a locked position 258 and an unlocked position 260. See FIG. 20. A spring (not shown) may be used to bias the lock bolt 256 in the unlocked position 260. The lock bolt 256 may be sized to engage at least one aperture 262 provided in a lock plate 264 affixed to the second cartridge magazine tray 118. A limit switch 266 may be mounted to the chassis 70 of data storage system 16 and may provide a signal to a lock control system 268 when the second data cartridge storage location 26 is positioned in its third position 50. The lock control system 268, in response thereto, may operate the lock actuator 254 to secure the second data cartridge storage location 26 in the third position 50 or to secure the drawer 20 in the fully retracted position (FIG. 2) when the first and second data cartridge storage locations 24 and 26 are engaged. Alternatively, the lock control system 268 may operate the lock actuator 254 in response to instructions entered by the system operator into the host computer system or the control panel 64 of the data storage system 16.

The various components of the drawer lock assembly 60 may comprise any of a wide range of devices and systems well-known in the art and that are readily commercially available. For example, the lock actuator 254 may comprise an electrically operated solenoid having a plunger 256 sized to engage the hole 262 provided in lock plate 264. In the embodiment shown and described herein, the lock bolt 256 is biased in the unlocked position 260 by a suitable spring (not shown). Consequently, energizing the solenoid will move the lock bolt 256 to the locked position 258 thus securing the second data cartridge storage location 26 in the third position 50 or securing the drawer 20 in the fully retracted position if the data cartridge storage locations 24 and 26 are engaged. Of course, other types of components and operating arrangements could also be used, as would be obvious to persons having ordinary skill in the art.

The data cartridge exchange apparatus 10 may be operatively associated with the control system contained within the data storage system 16 so that control system will be able to determine when the first and second data cartridge storage locations 24 and 26 have been moved from and returned back to their respective first and third positions 46 and 50 and can thus instruct the cartridge handling system 22 accordingly. In other words, the control system will be able to determine when either the first or second data cartridge storage location 24 or 26 has been moved so that it does not issue commands for the cartridge handling system 22 to access the data cartridges 18 within the data cartridge storage location 24 or 26 that has been moved until the respective data cartridge storage location 24 or 26 is returned to its appropriate place in the data storage system 16 (e.g., first or third position 46 or 50). In one embodiment, a drawer position sensor (not shown) may be provided that sends signals to the control system of data storage system 16 that are related to the respective positions of the data cartridge storage locations 24 and 26. For example, assuming that the first data cartridge storage location 24 is moved from its first position 46, the drawer position sensor may send a signal to the control system of data storage system 16 informing the control system that the data cartridges 18 within the first data cartridge storage location 24 have been moved and are thus no longer accessible to the cartridge handling system 22. Upon the return of the first data cartridge storage location 24 to its first position 46, the drawer position sensor may then inform the control system that the first data cartridge storage location 24 has been returned to its first position 50 and is thus accessible to the cartridge handling system 22.

Figure 21:
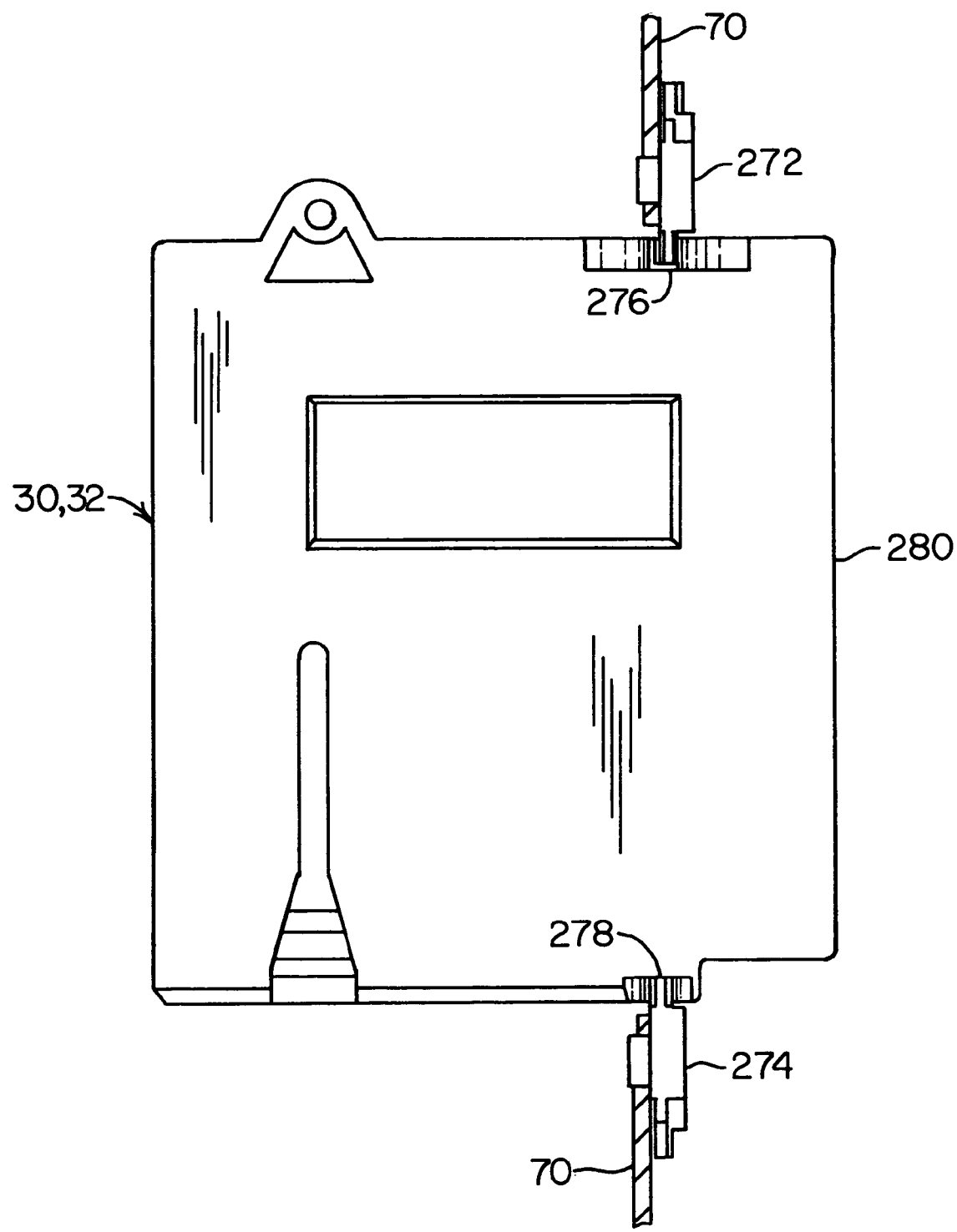
FIG. 21 is a side view in elevation showing the engagement of the cartridge magazine and the cartridge magazine reference rails.

It is generally preferred, but not required, that the data cartridge exchange apparatus 10 be provided with a cartridge magazine alignment apparatus 270 to provide more positive positioning of the first and second cartridge magazines 30 and 32 when the first and second data cartridge storage locations 24 and 26 are in their respective first and third positions 46 and 50. Referring now to FIGS. 7 and 21, the cartridge magazine alignment apparatus 270 may comprise a pair of elongate reference rails 272 and 274 which are mounted in spaced apart relation to the chassis 70 of data storage system 16. Each cartridge magazine 30 and 32 may be provided with first and second elongate slots 276 and 278 therein which are sized to slidably engage the respective elongate reference rails 272 and 274 when the first and second data cartridge storage locations 24 and 26 are moved to their respective first and third positions 46 and 50 (i.e., when the drawer 20 is moved to the fully retracted position). The engagement of the elongate reference rails 272 and 274 with the respective slots 276 and 278 in the magazines 30 and 32 slightly lifts the magazines 30 and 32 from the drawer 20 and holds each magazine 30 and 32 in a registration position 280, as best seen in FIG. 21. Consequently, when the first and second data cartridge storage locations 24 and 26 are in their respective first and third positions 46 and 50, the positions of the first and second cartridge magazines 30 and 32 are determined by the cartridge magazine alignment apparatus 270 and not by the first and second data cartridge storage locations 24 and 26.

The cartridge magazine alignment apparatus 270 more accurately positions the cartridge magazines 30 and 32 than would normally be possible if the cartridge magazines 30 and 32 were to remain seated in the first and second cartridge magazine trays 116 and 118, respectively. The more accurate positioning provided by the cartridge magazine alignment apparatus 270 substantially improves the likelihood that the cartridge access device 88 will be capable of engaging the selected data cartridge 18 without mis-feeds. The arrangement also dispenses with the need to provide a high precision drawer mounting system. That is, since the first and second magazines 30 and 32 are not held in position by the respective first and second data cartridge storage locations 24 and 26, the drawer 20 need not be designed to return the magazines 30 and 32 to their exact locations each time the first and second data cartridge storage locations 24 and 26 are returned to their respective first and third positions 46 and 50.

The data cartridge exchange apparatus 10 may be used in the data storage system 16 as follows to allow the system operator to access various data cartridges 18 contained within the data storage system 16. Consider, for example, a situation wherein the data storage system 16 has been provided with a plurality of data cartridges 18. During normal operation, the drawer 20 may remain in the fully retracted or closed position shown in FIG. 2, thereby allowing the cartridge handling system 22 internal to the data storage system 16 to access all of the data cartridges 18 contained therein. If the need arises for the system operator to access the data cartridges 18 within the fully closed drawer 20 (FIG. 2) (i.e., the first and second data cartridge storage locations 24 and 26 are in their respective first and third positions 46 and 50) and assuming that the first and second data cartridge storage locations 24 and 26 are engaged in one of the manners previously described herein (e.g., guide rail 38 is secured to guide rail 40 by the lock assembly 58 shown in FIG. 17), the system operator may pull on the front panel 62 of drawer 20 to move the first and second data cartridge storage locations 24 and 26 outside the data storage system 16 and thereby expose the data cartridges 18 within the first and second data cartridge storage locations 24 and 26. See FIG. 3. If the data cartridge exchange apparatus 10 was provided with a optional drawer lock assembly 60 (FIG. 20), then the lock control system 268 associated with the drawer lock assembly 60 would first have to be instructed to unlock the drawer 20 and do so before the drawer 20 was moved. The lock control system 268 could be so instructed by the data storage system control system (not shown), or by the system operator via control panel 64 or the host computer system to which the data storage system 16 is connected.

Once the drawer 20 has been opened or extended, the system operator may access the exposed data cartridges 18 for the exchange, removal, or replacement of the same. While the drawer 20 is in the extended position, the data storage system 16 may remain operable and the cartridge handling system 22 may continue to access the data cartridges 18 stored in the fixed cartridge storage array 66. However, since all of the data cartridges 18 within drawer 20 were moved when the system operator opened the drawer 20, the fixed cartridge storage array 66 comprises only those data cartridges 18 not stored in drawer 20. In other words, the cartridge handling system 22 will not access any of the data cartridges 18 within the drawer 20.

After the system operator has finished accessing the exposed data cartridges 18, the system operator may push on the front panel 62 of drawer 20 to return the first and second data cartridge storage locations 24 and 26 to their respective first and third positions 46 and 50 within the data storage system 16. See FIG. 2. As the first and second data cartridge storage locations 24 and 26 are being moved to their respective first and third positions 46 and 50, the elongate reference rails 272 and 274 engage the respective slots 276 and 278 on the cartridge magazines 30 and 32. When fully engaged with the slots 276 and 278, the reference rails 272 and 274 slightly lift the magazines 30 and 32 from the drawer 20 and hold each magazine 30 and 32 in the registration position 280 as shown in FIG. 21. After the drawer 20 has been fully closed, the system operator, the data storage system, or the limit switch 266 may command the lock control system 268 associated with the drawer lock assembly 60 to lock the drawer 20 in the fully closed position (i.e., to lock the data cartridge storage locations 24 and 26 in their respective first and third positions 46 and 50). See FIGS. 2 and 20. In this example, the data storage system 16 would need to re-inventory all of the data cartridges 18 within the drawer 20.

Assuming now that the system operator wants to access just the data cartridges 18 within the first data cartridge storage location 24, the first data cartridge storage location 24 would first have to be disengaged from the second data cartridge storage location 26. For example, in one embodiment, the lock control system 220 of lock assembly 58 (FIG. 17) would first have to be instructed to release the first guide rail 38 from the second guide rail 40 and do so before the first data cartridge storage location 24 is moved. The instructions to release the first guide rail 38 may be provided by the control system (not shown) contained within the data storage system 16, or by the system operator via control panel 64 or the host computer system. Once the data cartridge storage locations 24 and 26 are disengaged, the system operator may pull on the front panel 62 to move the first data cartridge storage location 24 outside the data storage system 16 so that the data cartridges 18 within the first data cartridge storage location 24 are exposed to the system operator. See FIG. 4.

As the system operator is accessing the data cartridges 18 within the first data cartridge storage location 24, the data storage system 16 may remain operable and the cartridge handling system 22 may continue to access the data cartridges 18 stored in the fixed cartridge storage array 66. In this example, however, the second data cartridge storage location 26 remained stationary in its third position 46 as did the data cartridges 18 therein when the first data cartridge storage location 24 was moved by the system operator. Consequently, the cartridge handling system 22 may continue to access the data cartridges 18 within the second data cartridge storage location 26, which may now be said to comprise a portion of the fixed cartridge storage array 66. In other words, only those data cartridges 18 that were moved and made accessible to the system operator (i.e., the data cartridges 18 within the first data cartridge storage location 24) were rendered inaccessible to the cartridge handling system 22.

After the user has finished accessing the first data cartridge storage location 24, the system operator may push on the front panel 62 to return the first data cartridge storage location 24 to its first position 46 adjacent the second data cartridge storage location 26. See FIG. 2. As the first data cartridge storage location 24 is being moved to its first position 46, the elongate reference rails 272 and 274 engage the slots 276 and 278 of the first cartridge magazine 30. When fully engaged with the slots 276 and 278, the reference rails 272 and 274 slightly lift the magazine 30 from the drawer 20 and hold the magazine 30 in the registration position 280 as shown in FIG. 21. After the first data cartridge storage location 24 has been returned to its first position 46, the lock control system 220 of lock assembly 58 may operate the lock actuator 216 to secure the first guide rail 38 to the second guide rail 40 so that the first data cartridge storage location 24 may be moved along with the second data cartridge storage location 26 and/or so that the first data cartridge storage location 24 is secured in its first position 46 by the drawer lock assembly 60 via the second data cartridge storage location 26. In this example, the data storage system 16 would need to re-inventory only the data cartridges 18 within the first data cartridge storage location 24.

In the embodiment shown and described herein the data cartridge exchange apparatus 10 is configured so that the various data cartridges 18 carried by the drawer 20 are contained within one or more cartridge magazines 28 (e.g., first and second cartridge magazine 30 and 32) which may be removed or replaced in their entirety. That is, the entire first and second magazines 30 and 32 may be removed by the system operator, thereby allowing for the convenient exchange, removal, or replacement of the plurality of data cartridges 18 contained within the cartridge magazines 30 or 32. The cartridge magazines 30 and 32 may each be provided with a handle 282 (FIGS. 1 and 2) to allow each of them to be conveniently carried by the system operator.

It should be noted that any of the data cartridges 18 contained within the data storage system 16 may be accessed via the data cartridge exchange apparatus 10. For example, the data cartridges 18 stored in the cartridge magazines 28 that are positioned in the fixed cartridge storage array 66 (FIG. 3) located opposite the drawer 20 also may be accessed by instructing the cartridge handling system 22 to move the selected data cartridges 18 from the fixed cartridge storage array 66 to the movable cartridge storage array 68 (e.g., the first and second data cartridge storage locations 24 and 26 when the first guide rail 38 is secured to the second guide rail 40). After the selected data cartridges 18 have been transferred from the fixed cartridge storage array 66 to the movable cartridge storage array 68, the system operator may access the transferred data cartridges 18 in the manner already described. Alternatively, if the data storage system 16 is provided with a second drawer, the system operator may access the data cartridges contained in the second drawer in the manner already described for the first drawer 20.

It is contemplated that the inventive concepts herein described may be variously otherwise embodied and it is intended that the appended claims be construed to include alternative embodiments of the invention except insofar as limited by the prior art.

What is claimed is:

1. Data cartridge exchange apparatus used in a data storage system, said data cartridge exchange apparatus comprising a moveable cartridge storage array having at least a first data cartridge storage location and a second data cartridge storage location, said first data cartridge storage location being operatively associated with said second data cartridge storage location so that said first data cartridge storage location is independently moveable with respect to said second data cartridge storage location when said second data cartridge storage location is accessible by the data storage system.

2. The data cartridge exchange apparatus of claim 1, wherein said first data cartridge storage location is accessible by the data storage system when said first data cartridge storage location is in a first position with respect to said second data cartridge storage location and wherein said first data cartridge storage location is accessible by a system operator when said first data cartridge storage location is in a second position with respect to said second data cartridge storage location.

3. The data cartridge exchange apparatus of claim 1, wherein said second data cartridge storage location is accessible by the data storage system when said second data cartridge storage location is in a third position and wherein said second data cartridge storage location is accessible by a system operator when said second data cartridge storage location is in a fourth position.

4. The data cartridge exchange apparatus of claim 1, wherein said first data cartridge storage location is releasably engageable with said second data cartridge storage location so that said first data cartridge storage location is in a first position with respect to said second data cartridge storage location when said first data cartridge storage location is engaged with said second data cartridge storage location and so that said first data cartridge storage location is in a second position with respect to said second data cartridge storage location when said first data cartridge storage location is disengaged from said second data cartridge storage location.

5. The data cartridge exchange apparatus of claim 4, wherein said first data cartridge storage location is slidably mounted to said second data cartridge storage location.

6. A data cartridge exchange apparatus used in a data storage system, said data cartridge exchange apparatus comprising a moveable cartridge storage array having at least a first data cartridge storage location and a second data cartridge storage location, said moveable cartridge storage array being operatively associated with the data storage system so that said moveable cartridge storage array is moveable with respect to said data storage system, said first data cartridge storage location being operatively associated with said second data cartridge storage location so that said first data cartridge storage location is independently moveable with respect to said second data cartridge storage location when said second data cartridge storage location is accessible by the data storage system.

7. A data storage system, comprising:

a cartridge handling system;

a fixed cartridge storage array defining at least one data cartridge storage location, said fixed cartridge storage array being mounted within said data storage system so that said at least one data cartridge storage location can be accessed by said cartridge handling system; and a moveable cartridge storage array defining at least a first data cartridge storage location and a second data cartridge storage location, said first data cartridge storage location being independently moveable with respect to said second data cartridge storage location so that said first data cartridge storage location can be moved with respect to said second data cartridge storage location between a first position and a second position, said moveable cartridge storage array being moveable with respect to said data storage system between a retracted position and an extended position so that at least said second cartridge storage location can be accessed by said cartridge handling system when said moveable cartridge storage array is in the retracted position.

8. The data storage system of claim 7, wherein said first data cartridge storage location can be accessed by said cartridge handling system when said first data cartridge storage location is in the first position and when said moveable cartridge storage array is in the retracted position.

9. The data storage system of claim 7, wherein said first data cartridge storage location can be accessed by a system operator when said first data cartridge storage location is in the second position and when said moveable cartridge storage array is in the retracted position.

10. The data storage system of claim 7, wherein said first data cartridge storage location can be accessed by a system operator when said first data cartridge storage location is in both the first position and the second position and when the moveable cartridge storage array is in the extended position.

11. The data storage system of claim 7, wherein said first data cartridge storage location is releasably engageable with said second cartridge storage location.

12. The data cartridge exchange apparatus of claim 7, wherein said first data cartridge storage location is slidably mounted to said second data cartridge storage location.

* * * * *

UNITED STATES PATENT AND TRADEMARK OFFICE
CERTIFICATE OF CORRECTION

| | | |
|---|---|---|
| PATENT NO. | : 7,104,618 B2 | Page 1 of 1 |
| APPLICATION NO. | : 11/305708 | |
| DATED | : September 12, 2006 | |
| INVENTOR(S) | : Michael J. Chaloner et al. | |

It is certified that error appears in the above-identified patent and that said Letters Patent is hereby corrected as shown below:

In column 1, line 27, delete ""jake box"" and insert -- "juke box" --, therefor.

Signed and Sealed this

Nineteenth Day of May, 2009

JOHN DOLL
*Acting Director of the United States Patent and Trademark Office*